US012665758B1

(12) United States Patent　　(10) Patent No.:　US 12,665,758 B1
Shub　　(45) Date of Patent:　Jun. 23, 2026

(54) METHOD AND SYSTEM FOR CLIENT-SIDE ARTIFICIAL INTELLIGENCE PROCESSING WITH END-TO-END ENCRYPTION IN WEB BROWSERS

(71) Applicant: Particular Ltd, Raanana (IL)

(72) Inventor: Arnon Shub, Raanana (IL)

(73) Assignee: Particular Ltd (IL)

( * ) Notice: Subject to any disclaimer, the term of this patent is extended or adjusted under 35 U.S.C. 154(b) by 0 days.

(21) Appl. No.: 19/409,717

(22) Filed: Dec. 4, 2025

(51) Int. Cl.
　*H04L 9/08*　　　(2006.01)
　*H04L 9/06*　　　(2006.01)
(52) U.S. Cl.
　CPC ............ *H04L 9/088* (2013.01); *H04L 9/0643* (2013.01)
(58) Field of Classification Search
　None
　See application file for complete search history.

(56) References Cited

U.S. PATENT DOCUMENTS

| | | | |
|---|---|---|---|
| 10,567,369 B2 | 2/2020 | Scott et al. | |
| 10,728,017 B2 | 7/2020 | Bent et al. | |
| 11,196,541 B2 | 12/2021 | Williams et al. | |
| 11,470,053 B2 | 10/2022 | Karame et al. | |
| 11,924,348 B2 | 3/2024 | Manevich et al. | |
| 11,936,784 B2 * | 3/2024 | Payne ................... | H04L 9/0877 |
| 11,991,280 B2 | 5/2024 | Leggette et al. | |
| 12,093,977 B2 | 9/2024 | Eich et al. | |

(Continued)

OTHER PUBLICATIONS

W3C, "WebAssembly Specification Version 1.0," World Wide Web Consortium, Mar. 5, 2019, pp. 1-120, https://www.w3.org/TR/wasm-core-1/, accessed on Nov. 10, 2025, Geneva, Switzerland.

(Continued)

*Primary Examiner* — Philip J Chea
*Assistant Examiner* — James Ross Hollister
(74) *Attorney, Agent, or Firm* — Dhiraj Jindal; PATENT YOGI LLC

(57)　　　　　　ABSTRACT

A method and system for solving the technical problem of incompatibility between end-to-end encryption and artificial intelligence processing by transforming web browser architecture to enable secure AI operations without server-side decryption. The invention implements mandatory header validation (COOP/COEP/HSTS/Origin Isolation), WebAssembly sandboxing with dual-phase import control and signed attestation, bounded plaintext windows ($T \leq 1000$ ms) with automatic emergency wiping, and NIST SP 800-88 compliant multi-pass memory clearing with XOR verification. GPU acceleration with zero-copy transfer and mandatory clearing achieves practical performance. HMAC audit chains ($H_n = HMAC\_k(H_{n-1} \parallel event \parallel nonce \parallel timestamp)$) provide regulatory compliance verification. Non-extractable keys bound to WebAuthn/FIDO2 ensure user control. The invention enables organizations to use advanced AI models (GPT-4, Claude, Gemini) with regulated data (HIPAA, PCI-DSS, GDPR) while maintaining full regulatory compliance through technical rather than contractual controls, eliminating the need for Business Associate Agreements in certain deployment models.

30 Claims, 15 Drawing Sheets

(56) References Cited

U.S. PATENT DOCUMENTS

| | | | | |
|---|---|---|---|---|
| 2014/0229729 A1* | 8/2014 | Roth | .................. | H04L 67/1097 |
| | | | | 713/153 |
| 2023/0134072 A1* | 5/2023 | Eich | ................ | H04N 21/44204 |
| | | | | 705/14.41 |
| 2025/0077611 A1* | 3/2025 | Balko | .................... | H04L 63/20 |

OTHER PUBLICATIONS

W3C, "Web Cryptography API," W3C Recommendation, Jan. 26, 2017, pp. 1-108, https://www.w3.org/TR/WebCryptoAPI/, accessed on Nov. 10, 2025, Geneva, Switzerland.
Onnx Runtime Team, "Running ONNX models in the browser," Microsoft Corporation Documentation, 2023, pp. 1-45, https://onnxruntime.ai/docs/tutorials/web/, accessed on Nov. 10, 2025, Redmond, WA, USA.
Reis, Charles; Moshchuk, Alexander; Oswal, Nasko, "Site Isolation: Process Separation for Web Sites within the Browser," Proceedings of the 28th Usenix Security Symposium, Aug. 14-16, 2019, pp. 1661-1678, https://www.usenix.org/conference/usenixsecurity19/presentation/reis, accessed on Nov. 10, 2025, Santa Clara, CA, USA.
TensorFlow.Js Team, "TensorFlow.js: Machine Learning for the Web and Beyond," arXiv preprint arXiv: 1901.05350, Jan. 16, 2019, pp. 1-9, https://arxiv.org/abs/1901.05350, accessed on Nov. 10, 2025, Cornell University, Ithaca, NY, USA.
USPTO, "2024 Guidance Update on Patent Subject Matter Eligibility, including on Artificial Intelligence," United States Patent and Trademark Office, Jul. 17, 2024, pp. 1-42, https://www.uspto.gov/patents/laws/examination-policy/subject-matter-eligibility, accessed on Nov. 10, 2025, Alexandria, VA, USA.
W3C, "Secure Contexts," W3C Candidate Recommendation, Sep. 15, 2021, pp. 1-28, https://www.w3.org/TR/secure-contexts/, accessed on Nov. 10, 2025, Geneva, Switzerland.
W3C, "Web Authentication: An API for accessing Public Key Credentials Level 2," W3C Recommendation, Apr. 8, 2021, pp. 1-145, https://www.w3.org/TR/webauthn-2/, accessed on Nov. 10, 2025, Geneva, Switzerland.
Fido Alliance, "Client to Authenticator Protocol (CTAP) version 2.1," FIDO Alliance Proposed Standard, Jun. 15, 2021, pp. 1-180, https://fidoalliance.org/specs/fido-v2.1-ps-20210615/fido-client-toauthenticator-protocol-v2.1-ps-20210615.html, accessed on Nov. 10, 2025, Wakefield, MA, USA.
Barnes, Richard; Beurdouche, Benjamin; Robert, Raphael; Millican, Jon; Omara, Emad; Cohn-Gordon, Katriel, "RFC 9420: The Messaging Layer Security (MLS) Protocol," Internet Engineering Task Force (IETF), Mar. 2023, pp. 1-132, https://datatracker.ietf.org/doc/html/rfc9420, accessed on Nov. 10, 2025, Fremont, CA, USA.
Kissel, Richard; Regenscheid, Andrew; Scholl, Matthew; Stine, Kevin, "NIST Special Publication 800-88 Revision 1: Guidelines for Media Sanitization," National Institute of Standards and Technology, Dec. 2014, pp. 1-77, https://nvlpubs.nist.gov/nistpubs/SpecialPublications/NIST.SP.800-88r1.pdf, accessed on Nov. 10, 2025, Gaithersburg, MD, USA.
W3C, "WebAssembly Core Specification, Section 7: Security Considerations," World Wide Web Consortium, Dec. 5, 2024, pp. 1-15, https://www.w3.org/TR/wasm-core-1/#security, accessed on Nov. 10, 2025, Geneva, Switzerland.
Owasp Foundation, "Owasp Top 10—2021, A08:2021—Software and Data Integrity Failures," Open Web Application Security Project, 2021, pp. 1-8, https://owasp.org/Top10/A08_2021-Software_and_Data_Integrity_Failures/, accessed on Nov. 10, 2025, Columbia, MD, USA.
Nvidia Corporation, "Cuda C++ Best Practices Guide, Version 12.x, Chapter 9: GPU Memory Management and Security," NVIDIA Developer Documentation, 2024, pp. 85-112, https://docs.nvidia.com/cuda/cuda-c-best-practices-guide/, accessed on Nov. 10, 2025, Santa Clara, CA, USA.
Barth, Adam; Jackson, Collin; Reis, Charles, "The Security Architecture of the Chromium Browser," Stanford University Computer Science Technical Report, 2008, pp. 1-14, https://crypto.stanford.edu/websec/chromium/, accessed on Nov. 18, 2025, Stanford, CA, USA.
W3C, "WebGPU," W3C Working Draft, Aug. 2024, Section 18 Security, pp. 1-25, https://www.w3.org/TR/webgpu/#security, accessed on Nov. 18, 2025, Geneva, Switzerland.
Kocher, Paul; Horn, Jann; Fogh, Anders; Genkin, Daniel; Gruss, Daniel; Haas, Werner; Hamburg, Mike; Lipp, Moritz; Mangard, Stefan; Prescher, Thomas; Schwarz, Michael; Yarom, Yuval, "Spectre Attacks: Exploiting Speculative Execution," 2019 IEEE Symposium on Security and Privacy, May 2019, pp. 1-19, https://spectreattack.com/spectre.pdf, accessed on Nov. 18, 2025, San Francisco, CA, USA.
The correct reference for that work is the Usenix Security 2022 paper "Provably-Safe Multilingual Software Sandboxing using WebAssembly." I will update Reference B4 in the IDS to use the Usenix Security citation and URL (e.g., https://www.usenix.org/conference/usenixsecurity22/presentation/bosamiya ) instead of the non-resolving DOI.

* cited by examiner

700

| KEY DERIVATION HKDF-SHA256 | 710 |

| WEBAUTHN/FIDO2 BINDING NON-EXTRACTABLE | 720 |

KEY STORAGE

| EXTRACTABLE | FALSE |
| ALGORITHM | AES-256-GCM |
| USAGE | ENCRYPT/DECRYPT |

725

| ROTATION SCHEDULE 30 DAYS | 730 |

800

810

HEADER VALIDATION
COOP/COEP/HSTS/ORIGIN-ISOLATION

820

TLS VERIFICATION
TLS 1.3+

830

CERTIFICATE PINNING

840

SECURE CONTEXT ESTABLISHED

TIMEOUT DETECTION
$T\_current - T\_start \geq T\_max$

1010

IMMEDIATE SUSPENSION
ALL OPERATIONS HALTED

1020

MULTI-PASS CLEARING
$\leq$ 15ms TOTAL
PASS 1: 5ms | PASS 2: 3ms | PASS 3: 5ms | VERIFY: 2ms

1030

AUDIT EVENT GENERATION

1040

SAFE STATE RETURN

1050

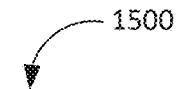

| Security Property | Tier 1 | Tier 2 | Tier 3 | Tier 4 |
|---|---|---|---|---|
| Encrypted data-at-rest | ✓ AES-256-GCM | ✓ AES-256-GCM | ✓ AES-256-GCM | ✓ AES-256-GCM |
| Non-extractable keys | ✓ Hardware-bound | ✓ Hardware-bound | ✓ Hardware-bound | ✓ Hardware-bound |
| Bounded plaintext window | ≤1000ms | ≤800ms | ≤500ms | ≤300ms |
| Emergency wipe SLA | ≤15ms | ≤15ms | ≤15ms | ≤15ms |
| XOR memory verification | ✓ 3-pass | ✓ 3-pass | ✓ 3-pass | ✓ 3-pass |
| HMAC audit chain | ✓ | ✓ | ✓ | ✓ |
| PASS/FAIL header enforcement | ✓ | ✓ | ✓ | ✓ |
| Guard pages | ✓ | ✓ | ✓ | ✓ |
| Dual-phase WASM validation | ✓ | ✓ | ✓ | ✓ |

FIG. 15

METHOD AND SYSTEM FOR CLIENT-SIDE ARTIFICIAL INTELLIGENCE PROCESSING WITH END-TO-END ENCRYPTION IN WEB BROWSERS

FIELD OF THE INVENTION

The present invention relates generally to secure data processing systems, and more particularly to methods and systems for performing artificial intelligence operations on end-to-end encrypted data entirely within a web browser environment without server-side decryption.

BACKGROUND OF THE INVENTION

The proliferation of artificial intelligence (AI) services has created unprecedented capabilities for data analysis, natural language processing, and pattern recognition. However, these services typically require users to upload their data to cloud servers for processing, creating fundamental security and privacy vulnerabilities that prevent their use with regulated data.

Current approaches to AI processing face several critical limitations:

Regulatory Compliance Barriers: Advanced AI services (e.g., OpenAI GPT-4, Anthropic Claude, Google Gemini, etc.) typically do not provide Business Associate Agreements (BAAs) required for HIPAA compliance in standard deployment models, nor do they offer certifications for FINRA, PCI-DSS, or other regulatory frameworks.

Server-Side Processing Requirements: Traditional AI services require data to be transmitted to and processed on external infrastructure. Healthcare organizations cannot send Protected Health Information (PHI) to OpenAI, financial institutions cannot send customer data to Anthropic, and law firms handling sensitive cases cannot use cloud-based AI services.

Homomorphic Encryption: While theoretically allowing computation on encrypted data, homomorphic encryption suffers from computational overhead of $1000\times$-$10000\times$, making it impractical for complex AI operations.

Local Installation Barriers: While organizations could theoretically download and run AI models locally, this requires significant technical expertise, computational resources, and ongoing maintenance.

Prior Art Limitations: While US20170180115A1 (Microsoft, 2015) described homomorphic encryption for cloud computing, and US20220004929A1 (Google, 2020) provided an on-device machine learning platform, neither enables the use of advanced third-party AI models with regulated data in a browser environment.

Browser-Based Machine Learning Prior Art: U.S. Pat. No. 12,093,977 (Brave Software, 2024) discloses a browser-based machine learning system enabling local model execution for privacy preservation. While Brave's approach provides benefits by avoiding server-side processing, it does not address the specific technical problem solved by the present invention: AI processing of encrypted regulated data with compliance guarantees. The Brave patent focuses on general-purpose ML inference in browsers but lacks critical elements required for regulated data processing: (1) no PASS/FAIL header validation with mandatory secure context prerequisites (COOP/COEP/HSTS/Origin Isolation) and reject paths essential for regulatory compliance frameworks; (2) no bounded plaintext windows ($T \leq 1000$ ms) with emergency wipe mechanisms required for preventing memory forensics attacks; (3) no dual-phase WASM attestation with cryptographic binding to audit chains necessary for proving compliance with data handling policies; (4) no XOR-verified memory clearing implementing NIST SP 800-88 mandated by regulatory frameworks for cryptographic material; and (5) no HMAC audit chains linking decryption, processing, re-encryption, and wiping operations required for regulatory audit documentation. The present invention uniquely combines browser-side AI processing with encrypted data lifecycle management, temporal security guarantees ($T \leq 1000$ ms), and cryptographic audit capabilities specifically designed to meet regulatory compliance requirements (HIPAA, PCI-DSS, FINRA, attorney-client privilege). Brave solves "run ML models locally for privacy"; the present invention solves the fundamentally different problem: "process AI operations on encrypted regulated data with provable compliance and cryptographic guarantees." The technical approaches, security architectures, and intended use cases are distinct.

Economic Impact: The inability to use AI with regulated data costs organizations billions annually in missed opportunities. Healthcare providers cannot use AI for diagnosis assistance, financial institutions cannot leverage AI for fraud detection on customer data, and law firms cannot use AI for case analysis.

Technical Challenges: Browser environments present unique challenges for secure AI processing. JavaScript's memory management, the lack of direct hardware access, and browser security policies all create barriers to implementing secure, high-performance AI operations.

Current Workarounds Are Inadequate: Organizations currently resort to manual processes, de-identification (which reduces data utility), or expensive on-premises installations. These workarounds are inefficient, costly, and often still fail to meet regulatory requirements.

The Browser as a Security Boundary: Modern web browsers implement sophisticated security models, including same-origin policy, content security policy, and sandboxing. However, these mechanisms were not designed for AI processing of encrypted data.

WebAssembly Promise and Limitations: WebAssembly provides near-native performance in browsers but lacks built-in security features for handling sensitive data. Existing WebAssembly implementations allow unrestricted imports that could lead to data exfiltration.

GPU Acceleration Challenges: While WebGPU and WebGL enable GPU acceleration in browsers, they were not designed with security requirements for processing encrypted data. GPU memory persists across operations, creating potential data leakage vectors.

Audit and Compliance Requirements: Regulatory frameworks require demonstrable proof of data protection. Current browser-based applications lack cryptographic audit trails that can prove compliance with data handling requirements.

Key Management Complexity: Secure key management in browser environments is challenging. The Web Crypto API provides cryptographic primitives but doesn't address key lifecycle management for regulatory compliance.

Memory Clearing Inadequacy: JavaScript's garbage collection is non-deterministic, making it impossible to guarantee when sensitive data is actually removed from memory. This creates compliance risks for regulated data processing.

Time-Based Security Requirements: Many security protocols require time-bounded operations, but JavaScript's event loop and asynchronous nature make enforcing strict temporal bounds challenging.

Prior Art Summary: Existing solutions either require server-side processing (violating E2EE), use impractical encryption schemes (homomorphic), or require complex local installations. No prior art enables browser-based AI processing of encrypted data with regulatory compliance.

Need for Innovation: There exists a critical need for a system that enables organizations to leverage advanced AI capabilities while maintaining end-to-end encryption, regulatory compliance, and practical performance, all within the familiar browser environment.

SUMMARY OF THE INVENTION

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

The present invention overcomes the limitations of prior art by providing a method and system for performing artificial intelligence operations on end-to-end encrypted data entirely within a web browser environment without exposing decrypted data to external server infrastructure. The invention solves the specific technical problem of incompatibility between end-to-end encryption and AI processing through browser-level architectural transformations that override conventional browser behavior.

In one aspect, the invention provides a method comprising validating security headers including COOP, COEP, HSTS, and Origin Isolation as prerequisite conditions with PASS/FAIL enforcement; implementing dual-phase WebAssembly import validation comprising load-time pattern matching prohibiting categories including network operations (e.g., fetch, XMLHttpRequest, WebSocket, WebRTC), DOM access (e.g., document, window, navigator), code evaluation (e.g., eval, Function, importScripts), and persistent storage APIs (e.g., localStorage, indexedDB), with instantiation-time signed attestation; enforcing a bounded plaintext window $T \le 1000$ milliseconds from decryption to re-encryption with automatic emergency wiping; establishing guard pages using unmapped memory regions and 64-byte cache-aligned buffers; performing verified multipass memory clearing per NIST SP 800-88 with 3-pass random-zero-random and XOR verification; generating cryptographic audit trails using HMAC chains with formula $H_n=HMAC\_k(H_{n-1} \parallel event \parallel nonce \parallel timestamp)$; implementing zero-copy CPU→GPU tensor transfer with mandatory clearing within 100 ms; and utilizing non-extractable keys bound to WebAuthn/FIDO2 with scheduled rotation for forward secrecy.

In another aspect, the invention provides a system comprising a secure context validator enforcing prerequisite headers; a memory allocator implementing guard pages and cache alignment; a WebAssembly execution environment with dual-phase import validation and Security Monitor generating signed attestations; a bounded execution controller enforcing plaintext exposure windows with emergency wipe capability; a GPU acceleration module implementing zero-copy transfer with mandatory clearing; an audit chain generator creating tamper-evident logs; a cryptographic processor with non-extractable key storage; and a verified memory wipe module implementing NIST SP 800-88 compliance.

The invention achieves substantial advantages over prior art: enables use of non-BAA AI services (GPT-4, Claude, Gemini) with regulated data while maintaining full compliance; eliminates need for server infrastructure or local installation; provides cryptographically verifiable audit trails for regulatory compliance; achieves practical performance with significant reduction in total processing time compared to cloud solutions in representative internal, non-binding benchmarks; maintains user control through browser-based key management; and scales immediately without infrastructure investment.

The present invention constitutes a practical application providing concrete improvements to computer functionality. The claimed methods transform the web browser through platform-specific mechanisms, including cache-aligned memory structures (Claim 26), fault-intercepting guard pages (Claim 28), hardware-bound key storage (Claims 13, 27), and measurable timing guarantees (Claims 2, 9, 29). Unlike conventional browsers, the invention achieves verifiable security properties through architectural modifications rather than policy enforcement, solving the specific technical problem of incompatibility between end-to-end encryption and AI processing without preempting encryption or AI fields generally. The transformation is evidenced by: (1) physical memory operations with NIST SP 800-88 verified clearing; (2) hardware integration with GPU and WebAuthn/FIDO2 devices; (3) measurable temporal guarantees $(T \le 1000$ ms, emergency wipe $\le 15$ ms, GPU clearing $\le 100$ ms); and (4) platform-specific fault handling mechanisms, all of which constitute technical improvements to browser architecture not achievable through conventional security policies alone.

These and other features and advantages of the invention will become apparent from the following detailed description and accompanying drawings, which illustrate by way of example the features of the invention.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and subcombinations described in the detailed description.

BRIEF DESCRIPTION OF THE DRAWINGS

FIG. 15 illustrates a table 1500 showing security properties across execution tiers, in accordance with some embodiments.

DETAILED DESCRIPTION OF THE INVENTION

The present invention will now be described in detail with reference to the accompanying drawings. The following description is provided to enable any person skilled in the art to make and use the invention and sets forth the best modes contemplated by the inventors for carrying out the invention. Various modifications will remain readily apparent to those skilled in the art.

Glossary of Terms and Acronyms

The following terms and acronyms are used throughout the detailed description:

COOP—Cross-Origin-Opener-Policy
COEP—Cross-Origin-Embedder-Policy
HSTS—HTTP Strict-Transport-Security
JSON—JavaScript Object Notation
CSV—Comma-Separated Values
WebAuthn—Web Authentication API, part of the FIDO2 standards
HKDF—HMAC-based Key Derivation Function
HKDF-SHA256—HMAC-based Key Derivation Function using SHA-256
WebGPU—Web Graphics API exposing GPU hardware to the web
WebGL—Web Graphics Library for 2D/3D graphics in browsers
WebAssembly/WASM—binary instruction format for a stack-based virtual machine
HIPAA—Health Insurance Portability and Accountability Act
PCI-DSS—Payment Card Industry Data Security Standard
GDPR—General Data Protection Regulation
CCPA—California Consumer Privacy Act
FERPA—Family Educational Rights and Privacy Act
COPPA—Children's Online Privacy Protection Act
FISMA—Federal Information Security Modernization Act
AI—Artificial Intelligence
CPU—Central Processing Unit
GPU—Graphics Processing Unit API/APIs—Application Programming Interface
DOM—Document Object Model
SIMD—Single Instruction, Multiple Data
TLS—Transport Layer Security (e.g., TLS 1.3)
HTTPS—Hypertext Transfer Protocol Secure
HMAC—Hash-based Message Authentication Code
SHA (e.g., SHA-256)—Secure Hash Algorithm
SHA-256—Secure Hash Algorithm 256-bit
NIST—National Institute of Standards and Technology
SP (in "NIST SP 800-88")—Special Publication
FIDO—Fast Identity Online
FIDO2—Fast Identity Online 2 (second-generation FIDO standard)
ECDSA—Elliptic Curve Digital Signature Algorithm
ECDSA-P256—Elliptic Curve Digital Signature Algorithm using the P-256 (NIST P-256) curve
WebRTC—Web Real-Time Communication
PQC—Post-Quantum Cryptography
FINRA—Financial Industry Regulatory Authority
PHI—Protected Health Information
POSIX—Portable Operating System Interface
XML—Extensible Markup Language
PDF—Portable Document Format
Code Listings and Pseudocode: All code listings and examples presented herein are exemplary pseudocode illustrations only. Equivalent implementations using different programming languages, frameworks, software architectures, or computational approaches are expressly contemplated and fall within the scope of the claimed invention. The code examples serve to demonstrate enablement and are not limiting as to implementation details.

System Architecture

Figure 1:
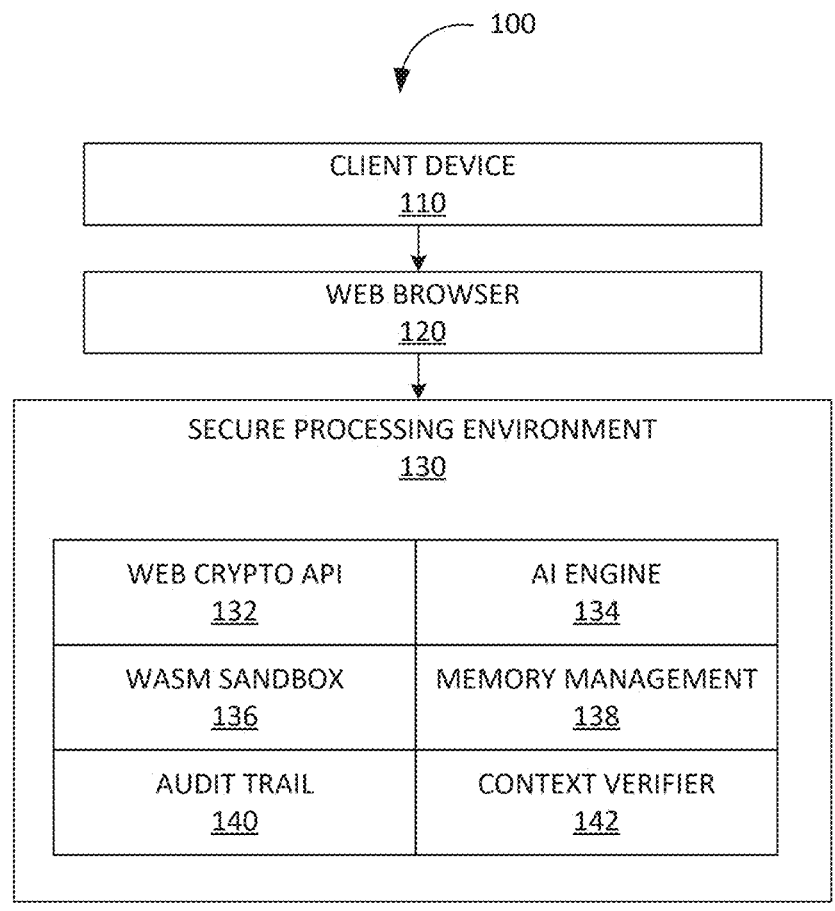
FIG. 1 illustrates an overall architecture of a system (100) showing client-side processing environment with a Client Device (110) executing a Web Browser (120) containing the Secure Processing Environment (130), demonstrating the integration of cryptographic and AI processing components within browser security boundaries, in accordance with some embodiments.

Referring to FIG. 1, the system architecture (100) comprises a Client Device (110) executing a Web Browser (120) containing a Secure Processing Environment (130). The Secure Processing Environment integrates Web Crypto API (132) for cryptographic operations, AI Engine (134) for inference processing, WASM Sandbox (136) for memory isolation, Memory Management (138) for secure allocation, Audit Trail (140) for compliance logging, and Context Verifier (142) for security enforcement.

The architecture transforms the browser from a passive content viewer into an active, secure computation platform capable of processing regulated data with cryptographic guarantees. This transformation occurs entirely client-side without requiring server infrastructure or third-party trust relationships.

Specific Improvement to Computer Functionality: The claimed combination constitutes a specific improvement in browser computer functionality—not achievable by routine or conventional browser operation—by (i) enforcing secure contexts as a mandatory prerequisite gate with PASS/FAIL flow, (ii) constraining plaintext lifetimes through bounded temporal windows with automatic emergency wiping, (iii) introducing dual-phase WebAssembly attestation with cryptographic proof generation, and (iv) implementing verified memory clearing with XOR validation per NIST SP 800-88. These technical mechanisms override default browser behavior to create a secure execution environment, enabling AI processing on encrypted data while maintaining regulatory compliance.

Security Header Validation and PASS/FAIL Enforcement

Figure 11:
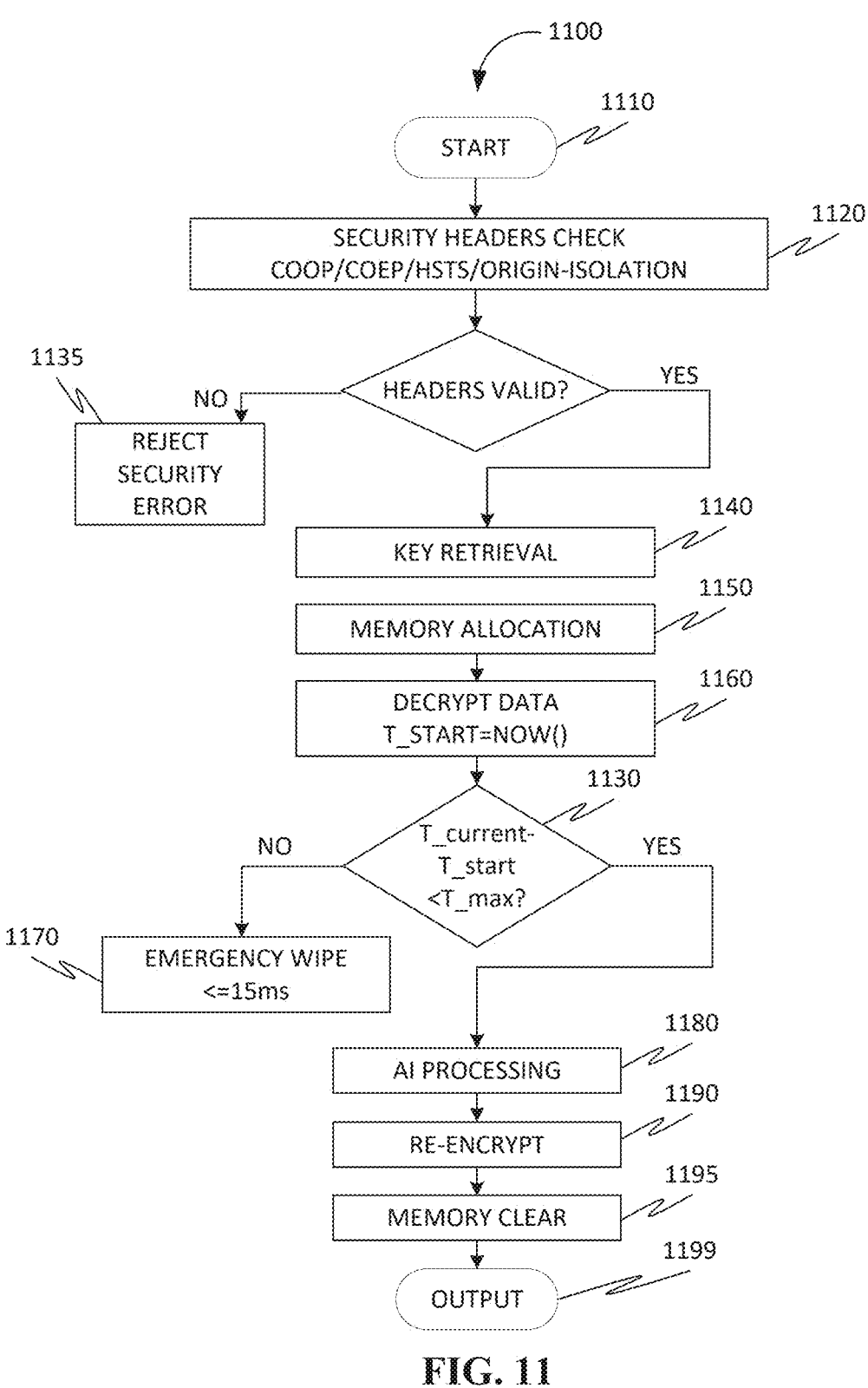
FIG. 11 depicts a complete PASS/FAIL enforcement flow (1100) showing Start (1110), Security Headers Check (1120) for COOP/COEP/HSTS/Origin Isolation, decision diamond for headers validity, REJECT path (1135) with security error for failed validation, Key Retrieval (1140), Memory Allocation (1150), Decrypt Data (1160) with T_START=NOW ( ), decision diamond (1130) checking "T_current−T_start<T_max?", EMERGENCY WIPE path (1170) for timeout violations, AI Processing (1180), Re-Encrypt (1190), Memory Clear (1195), and Output (1199), demonstrating the comprehensive security enforcement mechanism, in accordance with some embodiments.
Figure 12:
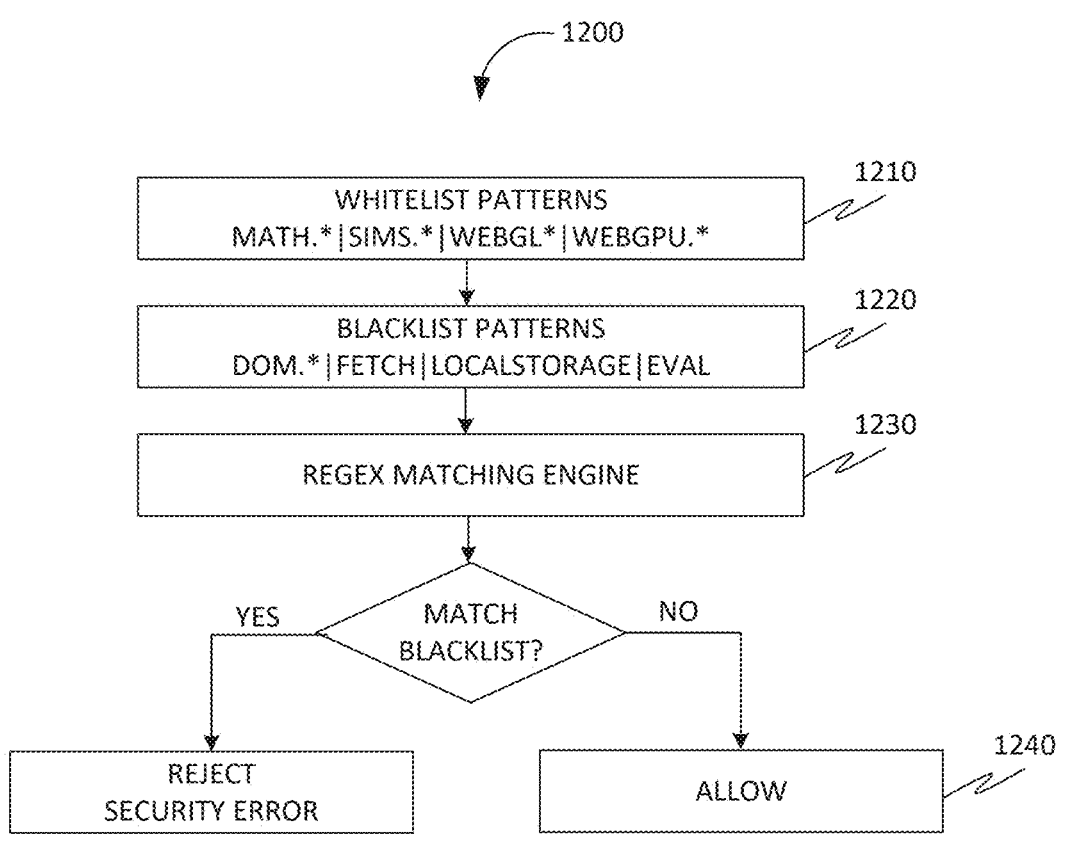
FIG. 12 illustrates a flow of import validation patterns (1200) showing Whitelist Patterns (1210) for Math., SIMD., WebGL., WebGPU., Blacklist Patterns (1220) for DOM., fetch., localStorage.*, Regex Matching Engine (1230), and Security Decision (1240) with immediate rejection of black-listed patterns, in accordance with some embodiments.
Figure 13:
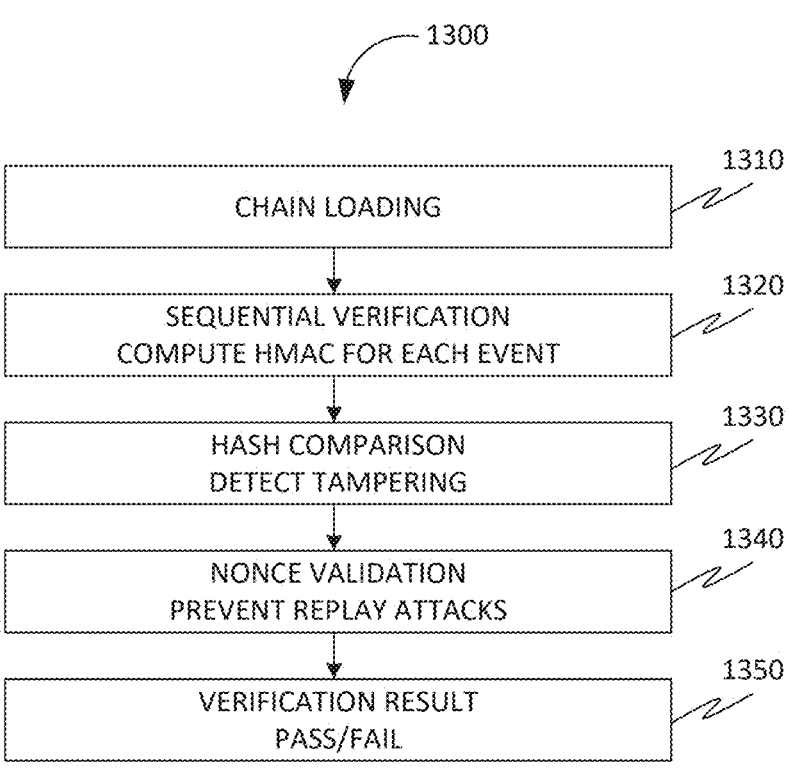
FIG. 13 shows an audit chain verification process (1300) illustrating Chain Loading (1310), Sequential Verification (1320) computing HMAC for each event, Hash Comparison (1330) detecting tampering, Nonce Validation (1340) preventing replay attacks, and Verification Result (1350) with pass/fail status, in accordance with some embodiments.
Figure 14:
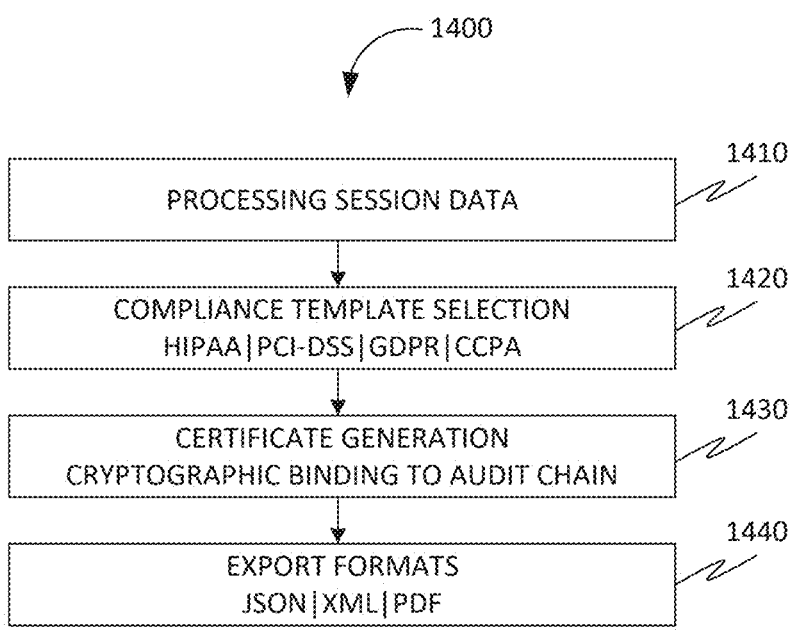
FIG. 14 depicts a compliance documentation generation system (1400) showing Processing Session Data (1410), Compliance Template Selection (1420) for HIPAA/PCI-DSS/GDPR/CCPA, Certificate Generation (1430) with cryptographic binding to audit chain, and Export Formats (1440) in regulatory-specific schemas, in accordance with some embodiments.

Referring to FIG. 11, the system implements mandatory security header validation (element 1120) as the first gate in the PASS/FAIL enforcement flow. The validation checks:

Cross-Origin-Opener-Policy (COOP) set to "same-origin", preventing window references across origins Cross-Origin-Embedder-Policy (COEP) set to "require-corp" (or "credentialless" in browsers supporting modern relaxed isolation modes), enabling SharedArrayBuffer and high-precision timers Strict-Transport-Security (HSTS) with max-age $\geq 3153$-6000 (1 year) enforcing HTTPS Origin Isolation via browser policy or equivalent mechanism, ensuring process-level separation PASS/FAIL Flow Implementation: If any header validation fails, the system immediately executes the REJECT path (element 1135 in FIG. 11), terminating all processing and generating an audited security error event. Only upon successful validation (PASS) does the system proceed to Key Retrieval (element 1140) and subsequent processing steps.

Reduced-Capability Mode for Limited Browser Support: In browsers lacking Origin Isolation or full COEP support (e.g., certain Safari versions), the system enforces a reduced-capability mode disabling GPU kernels that fail PASS/FAIL prerequisites, while maintaining bounded plaintext windows ($T \leq 1000$ ms) and verified memory wiping on CPU/WASM execution paths. This graceful degradation preserves core security guarantees (steps a-i of Claim 1) while adapting to browser-specific limitations, ensuring enablement across heterogeneous browser environments without compromising fundamental security properties.

Hierarchical Fallback Chain for Cross-Browser Compatibility: The system implements a deterministic capability detection and fallback mechanism ensuring consistent security guarantees across heterogeneous browser environments. Upon initialization, the runtime performs hierarchical capability assessment and selects the optimal execution tier while maintaining invariant security properties.

Execution Tier Definitions: TIER 1 (Full Capability):
WebGPU with compute shader support
SharedArrayBuffer with cross-origin isolation
WebAssembly SIMD instructions
SubtleCrypto non-extractable keys
Maximum plaintext window: $T \leq 1000$ ms
GPU acceleration: Enabled
Performance factor: Baseline (1.0×)

Tier 2 (Reduced GPU):
WebGL 2.0 with floating-point textures
SharedArrayBuffer with cross-origin isolation
WebAssembly SIMD instructions
SubtleCrypto non-extractable keys
Maximum plaintext window: $T \leq 800$ ms (tighter bound compensating for WebGL security model)
GPU acceleration: WebGL fallback
Performance factor: 0.6-0.8×

Tier 3 (CPU-SIMD Only):
WebAssembly SIMD instructions
SubtleCrypto non-extractable keys
Maximum plaintext window: $T \leq 500$ ms (tighter bound compensating for lack of hardware isolation)
GPU acceleration: Disabled
Performance factor: 0.3-0.5×

Tier 4 (Minimum Viable):
WebAssembly MVP (without SIMD)
SubtleCrypto basic operations
Maximum plaintext window: $T \leq 300$ ms (strictest bound for maximum security)
GPU acceleration: Disabled
Performance factor: 0.2-0.3×

Security Guarantee Equivalence: All execution tiers maintain the following invariant security properties regardless of capability level, as shown in FIG. 15.

The progressively tighter plaintext window bounds in lower tiers compensate for reduced hardware isolation by minimizing the temporal attack surface. This ensures that even browsers with partial API support (e.g., Safari without SharedArrayBuffer, Firefox without WebGPU) can execute the invention securely, albeit with reduced performance, thereby enabling broad deployment across heterogeneous environments without compromising fundamental security properties required for regulatory compliance.

Fallback Chain Implementation Pseudocode:

```javascript
class RuntimeCapabilityDetector {
async initialize( ) {
// Phase 1: Detect available APIs
const capabilities={
webgpu: await this.detectWebGPU( ),
webgl2: this.detectWebGL2( ),
sharedArrayBuffer:                          typeof
    SharedArrayBuffer!=='undefined',
wasmSimd: await this.detectWasmSimd( ),
subtleCrypto: window.crypto?.subtle!=undefined,
crossOriginIsolated: self.crossOriginIsolated===true
};
// Phase 2: Verify security prerequisites
if (!capabilities.subtleCrypto) {
throw new SecurityError("SubtleCrypto required—can-
    not proceed");
}
if (!capabilities.crossOriginIsolated) {
console.warn("Cross-origin   isolation   unavailable—
    SharedArrayBuffer disabled");
capabilities.sharedArrayBuffer=false;
}
/ Phase 3: Select optimal execution tier
let tier, maxPlaintextWindow, gpuEnabled;
if (capabilities.webgpu && capabilities.sharedArrayBuf-
    fer &&
capabilities.wasmSimd) {
tier="TIER_1_FULL";
maxPlaintextWindow=1000; // ms
gpuEnabled=true;
console.log("Runtime:   TIER   1   (Full   Capability)–
    WebGPU+SIMD+SharedArrayBuffer");
} else if (capabilities.webgl2 && capabilities.wasmSimd)
    {
tier="TIER_2_REDUCED_GPU";
maxPlaintextWindow=800;  //  ms—tighter  bound  for
    WebGL
gpuEnabled=true;
console.warn("Runtime:   TIER   2   (Reduced   GPU)—
    WebGL fallback");
this.auditChain.addEvent({
type: 'TIER_FALLBACK',
from: 'TIER 1', to: 'TIER_2',
reason: 'WebGPU unavailable',
capabilities: capabilities
});
} else if (capabilities.wasmSimd) {tier="TIER_3_ CPU_
    SIMD";
maxPlaintextWindow=500;  //  ms—tighter  bound  for
    CPU-only
gpuEnabled=false;
console.warn("Runtime: TIER 3 (CPU-SIMD Only)—No
    GPU acceleration");
this.auditChain.addEvent({
type: 'TIER_FALLBACK',
from: 'TIER 2', to: 'TIER_3',
```

```javascript
reason: 'GPU unavailable', capabilities: capabilities
});
} else {
tier="TIER_4_MINIMUM";
maxPlaintextWindow=300; // ms—strictest bound
gpuEnabled=false;
console.warn("Runtime: TIER 4 (Minimum Viable)—
    WASM MVP only");
this.auditChain.addEvent({
type: 'TIER_FALLBACK',
from: 'TIER 3', to: 'TIER_4',
reason: 'WASM SIMD unavailable', capabilities: capa-
    bilities
}
// Phase 4: Initialize security subsystems with tier-appro-
    priate parameters
const memoryGuard=this.initializeMemoryGuard(tier);
const
    timingEnforcer=this.initializePlaintextWindowEnforcer
    (maxPlaintextWindow);                         const
    auditLogger=this.initializeHmacAuditChain( );
// Phase 5: Run self-test battery
const  testResults=await  this.runSecuritySelfTests(tier,
    capabilities); if
(testResults.anyFailure) {
throw new SecurityError('Self-test failed: ${testResults.
    failureReason}');
}
return {
tier: tier,
capabilities: capabilities,
maxPlaintextWindow:    maxPlaintextWindow,   gpuEn-
    abled: gpuEnabled,
attestation:   this.generateCapabilityAttestation(capabili-
    ties, testResults)
}
async detectWebGPU({
if (navigator.gpu===undefined) {
return {available: false, reason: "WebGPU API not pres-
    ent"};
}
try {
const adapter=await navigator.gpu.requestAdapter( );
if (adapter===null) {
return {available: false, reason: "No WebGPU adapter"};
}
const  device=await  adapter.requestDeviceo;  const
    features=Array.from(device.features);
return {
available: true, features: features, limits: device.limits
};
}catch (error) {
return {available: false, reason: error.message};
}
}
detectWebGL2( ) {
const  canvas=document.createElement('canvas');  const
    gl=canvas.getContext('webgl2');
if (!gl) {
return {available: false, reason: "WebGL 2.0 not sup-
    ported"};
}
// Check for floating-point texture support (required for
    ML operations)
const    floatTextureExt=gl.getExtension('EXT_color_
    buffer_float');
return {
```

```
available: true,
floatTextures: floatTextureExt!==null,
maxTextureSize: gl.getParameter(gl.MAX_TEXTURE_
    SIZE)
}
async detectWasmSimd( ) {
// Feature detection via WASM module compilation with
    SIMD instructions
const simdTestBytes=new Uint8Array([
0x00, 0x61, 0x73, 0x6d, // WASM magic number
0x01, 0x00, 0x00, 0x00, // Version 1
// Type section with SID v128 type
0x01, 0x04, 0x01, 0x7b, 0x00, 0x7b,
// Function section
0x03, 0x02, 0x01, 0x00,
// Code section with SIMD instruction
0x0a, 0x09, 0x01, 0x07, 0x00, 0xfd, 0x0c, 0x00, 0x00,
    0x0b
]);
try {
const module=await WebAssembly.compile(simdTest-
    Bytes); return {available: true
};
}catch (error) {
return {available: false, reason: "WASM SIMD not sup-
    ported"};
}
}
async runSecuritySelfTests(tier, capabilities) {const
    results={
memoryGuardTest: await this.testMemoryGuardso,
    plaintextWindowTest: await
this.testPlaintextWindowEnforcement( ), auditChainTest:
    await
this.testAuditChainIntegrity( ),
clearingTest: await this.testMemoryClearing( ), anyFail-
    ure: false,
failureReason: null
};
// Check if any test failed
for (const [testName, testResult] of Object.entries(re-
    sults)) {
if (testName==='anyFailure' || testName=== 'failureRea-
    son') continue; if
(!testResult.passed) {
results.anyFailure=true;
results.failureReason='${testName}failed:
    ${testResult.reason}'; break;
}
}
return results;
}
generateCapabilityAttestation(capabilities,    testResults)
    {const attestation={
timestamp: performance.now( ), capabilities: capabilities,
    testResults: testResults,
browserInfo: {
userAgent: navigator.userAgent, platform: navigator.plat-
    form, language: navigator.language
}
};
// Generate SHA-256 hash of attestation
const attestationJson=JSON.stringify(attestation);  const
    hash=this.sha256(attestationJson);
// Sign with session key (HMAC)
const signature=this.hmac(this.sessionKey, hash);
return {
. . . attestation, hash: hash,
signature: signature
}
}
```

Code Disclaimer: The foregoing code is exemplary pseudocode only. Equivalent implementations using different programming languages, frameworks, or architectures are expressly contemplated and fall within the scope of the claimed invention.

Cross-Platform Compatibility Assurance: The fallback chain mechanism ensures that the invention operates reliably across diverse browser environments while maintaining identical security guarantees. For example, Safari 16.4+ without SharedArrayBuffer support automatically falls to TIER 3 with T≤500 ms. Firefox 115+ without WebGPU support falls to TIER 2 with WebGL and T≤800 ms. Chrome 113+ with full support operates at TIER 1 with T≤1000 ms. This adaptive approach prevents deployment barriers while ensuring that regulatory compliance requirements remain satisfied regardless of browser capabilities, addressing USPTO enablement requirements across the full scope of supported environments.

Code Implementation Example:

```
    javascript
    class SecureContextValidator {
    validateo {
    const headers={
    coop:      this.getHeader('Cross-Origin-Opener-Policy'),
        coep:            this.getHeader('Cross-Origin-Embedder-
        Policy'), hsts: this.getHeader('Strict-Transport-Secu-
        rity'), origin: this.checkOriginIsolationo
    };
    if  (headers.coop!=='same-origin'  ||  headers.coep!==
        'require-corp'
    !this.validateHSTS(headers.hsts)||
    !headers.origin) {
    this.auditChain.addEvent({
    type: 'SECURITY_VALIDATION_FAILED',
    headers: headers,
    timestamp: performance.now( )
    });
    throw new SecurityError('Header validation failed—RE-
        JECT');
    }
    return true; // PASS
    }
    validateHSTS(hsts) {
    const match=hsts?.match(/max-age=(d+)/); return match
        && parseInt(match[1])>=31536000;
    }
    }
```

Code Disclaimer: The foregoing code is exemplary pseudocode only. Equivalent implementations using different programming languages, frameworks, or architectures are expressly contemplated and fall within the scope of the claimed invention.

This prerequisite validation ensures that all subsequent cryptographic operations occur within a secure context, preventing attacks via cross-origin communication, insecure transport, or inadequate process isolation.

Bounded Plaintext Window with Emergency Wipe

Referring to FIG. 11, elements 1160, 1130, and 1170, the system enforces a maximum plaintext exposure window T≤1000 milliseconds through continuous monitoring and automatic emergency wiping. FIG. 11 illustrates a complete PASS/FAIL enforcement flow with mandatory header validation (1120), decision points, emergency wipe paths (1170), and full processing sequence from start (1110) to output (1199). Operations associated with elements 1160 and 1190 are sensitive cryptographic operations. Operations associated with elements 1135 and 1170 are critical.

Temporal Enforcement Mechanism: Upon decryption (element 1160), the system records T_START=NOW( ) using performance.now( ) with microsecond precision. A monitoring loop executing every 100 ms via requestAnimation-Frame continuously evaluates the condition shown in decision diamond 1130: "T_current−T_start <T_max?"

Emergency Wipe Sequence: If the plaintext window is exceeded (NO path from diamond 1130), the system immediately triggers the Emergency Wipe sequence (element 1170), which must complete within 15 ms as measured by monotonic clock (performance.now( )), accounting for event-loop scheduling tolerance. This wipe sequence is also detailed in FIG. 10 (elements 1010-1050). The <15 ms SLA includes all three clearing passes plus XOR verification, with timing tolerance built-in per Implementation Notes as described herein, to ensure reliable operation across varying browser event-loop behaviors.

Implementation:

```
javascript
class PlaintextWindowEnforcer {constructor(maxWin-
   dow=1000) {
this.maxWindow=maxWindow;
   this.decryptionStart=null; this.monitoringActive=false;
}
startMonitoring( ) {
this.decryptionStart=performance.now(            );
   this.monitoringActive=true;
this.monitor( );
}
monitor( ) {
if (!this.monitoringActive) return;
const elapsed=performance.now( )−this.decryptionStart;
// Check decision diamond 1130: T_current−T_start
   <T_max?
if (elapsed>=this.maxWindow) {
/ NO path—trigger emergency wipe (element 1170)
this.emergencyWipe( ); return;
}
// Warning at 90% threshold
if (elapsed>=this.maxWindow*0.9) {this.auditChain.ad-
   dEvent({
type: 'PLAINTEXT_WINDOW_WARNING',
elapsed: elapsed,
threshold: this.maxWindow
}
// Continue monitoring
requestAnimationFrame(( )=>this.monitor( ));
}
emergencyWipe( ) {
const wipeStart=performance.now( );
/ Execute 15 ms emergency sequence (FIG. 10, element
   1030)
this.secureWipe.emergencyMultiPass( );
const wipeDuration=performance.now( )−wipeStart;
this.auditChain.addEvent({
type: 'EMERGENCY_WIPE_TRIGGERED', reason:
   'TIMEOUT_VIOLATION',
wipeDuration: wipeDuration, maxAllowed: 15
});
this.monitoringActive=false;
throw new SecurityError('Plaintext window exceeded—
   emergency wipe executed');
}
}
```

Code Disclaimer: The foregoing code is exemplary pseudocode only. Equivalent implementations using different programming languages, frameworks, or architectures are expressly contemplated and fall within the scope of the claimed invention.

Figure 2:
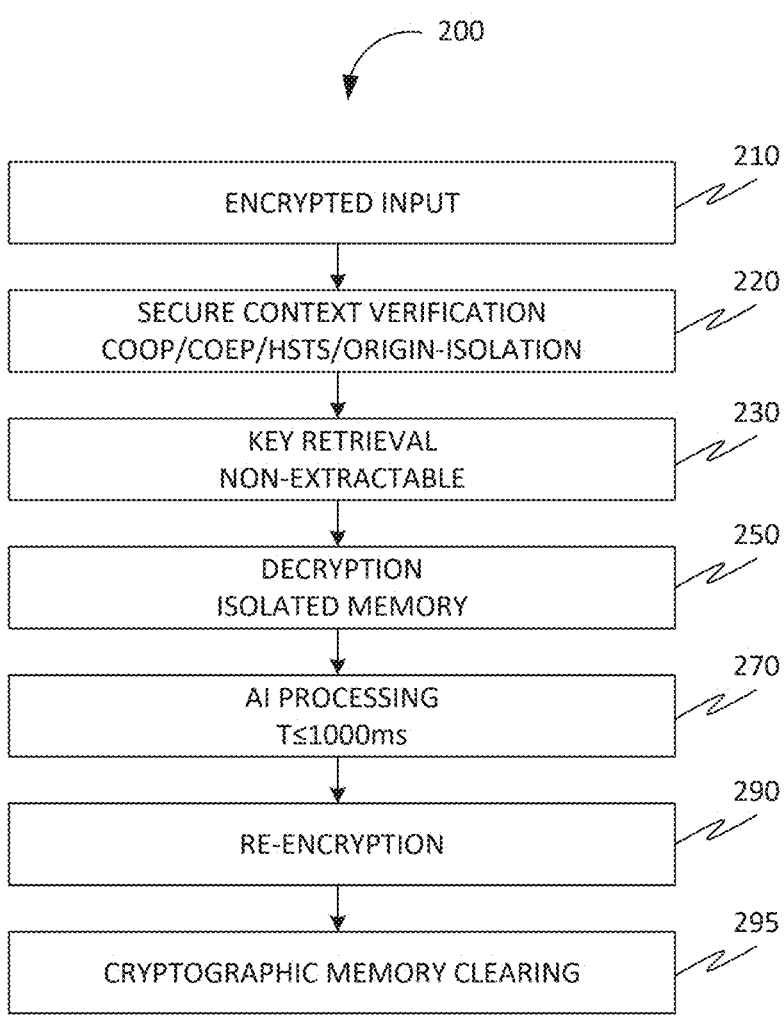
FIG. 2 depicts a detailed encryption/decryption process flow (200) with memory isolation boundaries, showing the sequential steps from encrypted input (210) through secure context verification (220), key operations(retrieval) (230), decryption within isolated memory (250), AI processing (270), re-encryption (290), and cryptographic memory clearing (295), in accordance with some embodiments.

Re-Encryption of Inference Outputs: All inference outputs generated during AI processing are re-encrypted prior to any persistence or transmission beyond the secure execution environment (FIG. 11, element 1190; FIG. 2, element 290). This ensures that plaintext data exists only within the bounded temporal window and is never stored or transmitted in unencrypted form. The re-encryption uses the same cryptographic keys and algorithms employed for initial encryption, maintaining end-to-end encryption throughout the entire processing lifecycle. See FIG. 2 (element 290) and FIG. 11 (element 1190) for the re-encryption stage executed prior to any persistence or transmission beyond the secure execution environment.

WebAssembly Dual-Phase Import Validation and Signed Attestation

Figure 3:
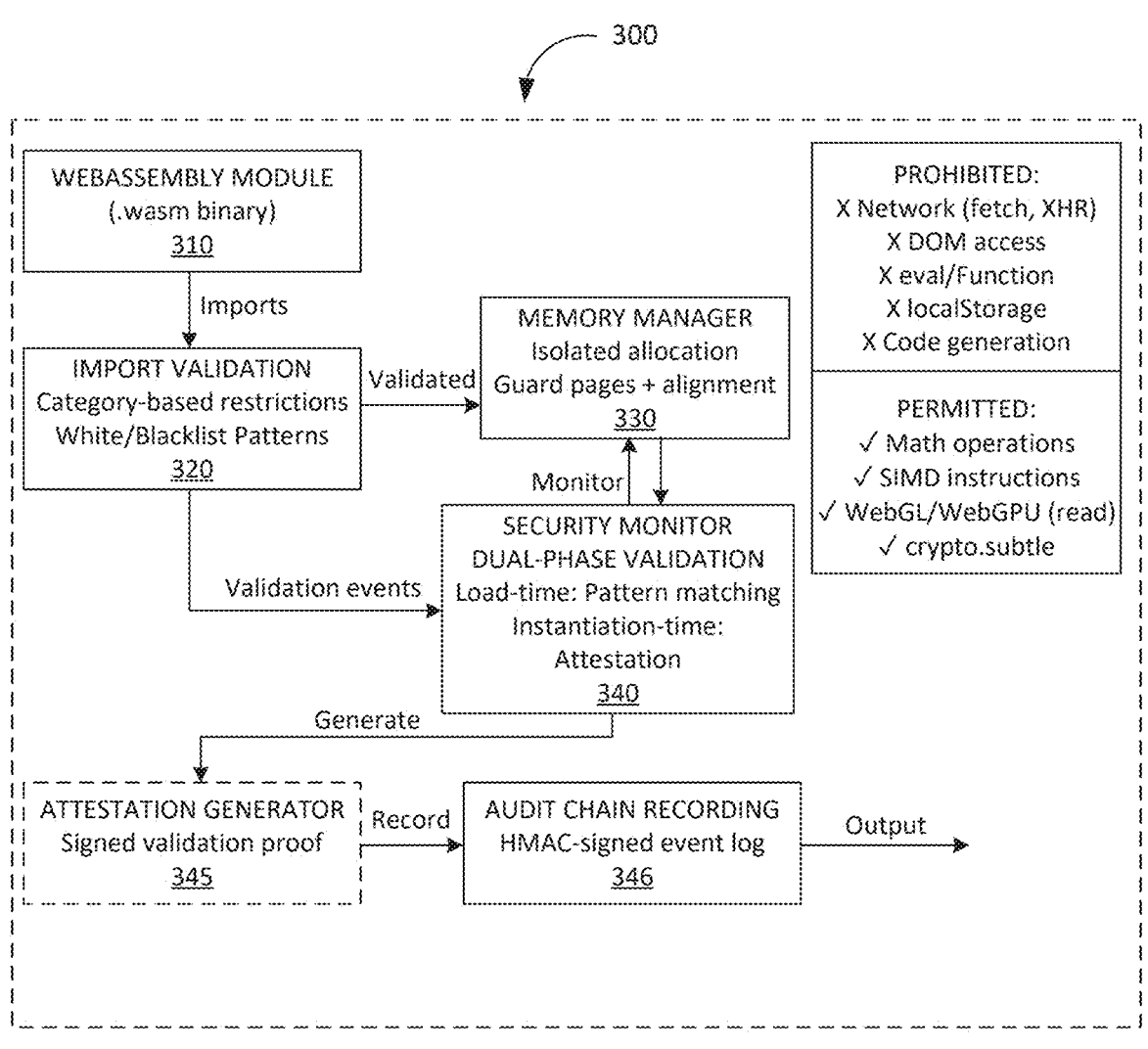
FIG. 3 shows an architecture of a WebAssembly sandbox (300) for AI model execution, illustrating the WebAssembly Module (310), Import Validation (320) with category-based restrictions and dual-phase validation, Memory Manager (330), Security Monitor (340) with dual-layer import validation, Attestation Generator (345) creating signed validation proofs, and Audit Chain Recording (346), demonstrating comprehensive security through load-time pattern matching and instantiation-time attestation generation, in accordance with some embodiments.

Referring to FIG. 3, the WebAssembly sandbox architecture implements comprehensive security through dual-phase validation. The Security Monitor (element 340) performs both load-time and instantiation-time verification, while the Attestation Generator (element 345) creates cryptographically signed validation proofs. WebAssembly Sandbox Architecture shows component interactions. Further, the components include Security Monitor (340) coordinates with Import Validation (320) and Memory Manager (330). Attestation Generator (345) creates signed proofs recorded in Audit Chain (346). Further, solid arrows indicate data flow between the components. Further, dashed arrows indicate control flows between the components. Further, the component 340 is a security component.

Phase 1—Load-Time Validation: The system parses the WebAssembly.Module import section using regex pattern matching against whitelist and blacklist patterns before instantiation.

Phase 2—Instantiation-Time Verification: During WebAssembly.instantiate( ), the system validates the import object and indirect call tables, generating a signed attestation.

Attestation Structure: The Attestation Generator (element 345 in FIG. 3) creates a signed proof containing:

Timestamp of validation (microsecond precision)

List of validated imports matching whitelist patterns

List of rejected imports matching blacklist patterns

SHA-256 hash of the WebAssembly module

Digital signature using ECDSA-P256

Implementation:

```
javascript
class WASMSecurityMonitor {
async validateAndAttest(wasmModule, importObject) {
// PHASE 1: Load-time validation (element 320 in FIG. 3)
const imports=this.parseImports(wasmModule);   const
   validation=this.validateImports(imports);
if (!validation.passed) {
throw new SecurityError('Import validation failed');
}
// PHASE 2: Instantiation-time verification (element 340
   in FIG. 3)
const instance=await WebAssembly.instantiate(wasm-
   Module, importObject);
// Generate signed attestation (element 345 in FIG. 3)
const attestation=await this.generateAttestation({time-
   stamp: performance.now( ),
validatedImports: validation.allowed, rejectedImports:
   validation.rejected,
```

```
moduleHash: await this.hashModule(wasmModule), vali-
    dationResult: 'PASSED'
});
// Record in audit chain (element 346 in FIG. 3)
this.auditChain.addEvent({
type: 'WASM_VALIDATION_ATTESTATION',
attestation: attestation, signature: attestation.signature
});
return instance;
}
async generateAttestation(data) {
const     attestationData=JSON.stringify(data);     const
    signature=await
crypto.subtle.sign(
{name: 'ECDSA', hash: 'SHA-256'},
this.signingKey,
new TextEncoder( ).encode(attestationData)
return {
. . . data,
signature: this.arrayBufferToBase64(signature)
};
}
}
}
```

Code Disclaimer: The foregoing code is exemplary pseudocode only. Equivalent implementations using different programming languages, frameworks, or architectures are expressly contemplated and fall within the scope of the claimed invention.

NIST SP 800-88 Compliant Memory Clearing with XOR Verification

Figure 5:
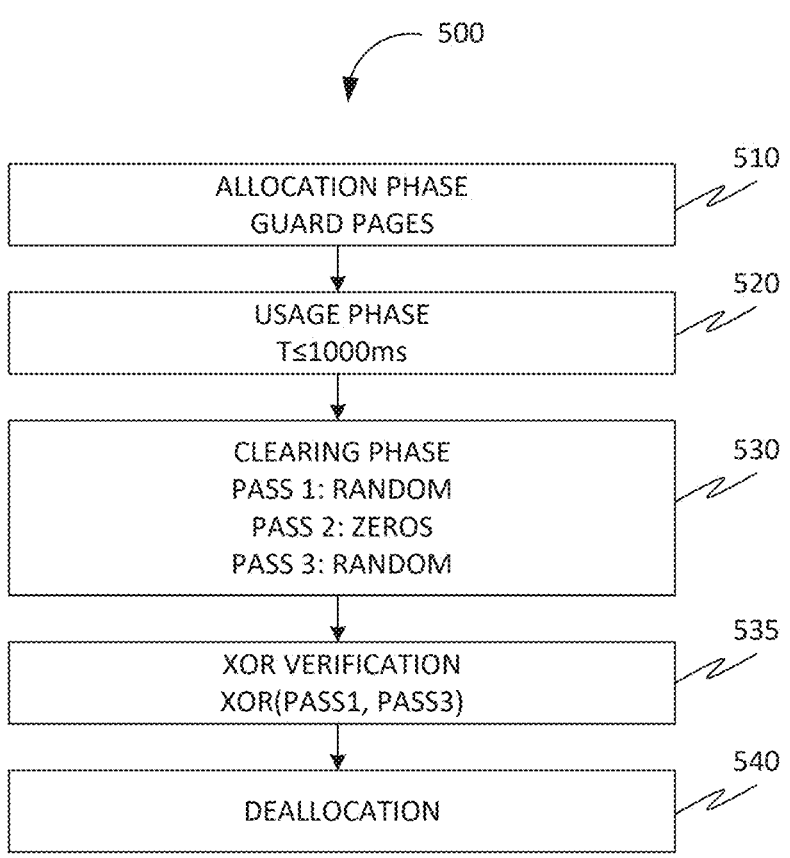
FIG. 5 depicts a memory lifecycle management system (500) showing Allocation Phase (510) with guard pages, Usage Phase (520) with bounded plaintext window T≤1000 ms, Clearing Phase (530) implementing three-pass random-zero-random sequence, XOR Verification (535) confirming complete erasure, and Deallocation (540), ensuring NIST SP 800-88 Rev. 1 compliance, in accordance with some embodiments.

Referring to FIG. 5, the memory lifecycle system implements secure clearing following NIST Special Publication 800-88 Revision 1 guidelines. The Clearing Phase (element 530) executes a three-pass random-zero-random sequence, followed by XOR Verification (element 535) to cryptographically confirm complete erasure.

Three-Pass Clearing Sequence:
  Pass 1 (element 530): Fill with cryptographically secure random data using crypto.getRandomValues( )
  Pass 2 (element 530): Overwrite with zeros
  Pass 3 (element 530): Fill with new cryptographically secure random data XOR Verification (element 535): The system verifies clearing by computing XOR(Pass1_data, Pass3_data) and analyzing the result for high entropy and lack of correlation with the original data. A threshold-based verification is performed: if a sufficient percentage of bits differ between Pass1 and Pass3 (e.g., ≥40%), the clearing is deemed successful. The threshold value and sampling methodology are parametric and may be adapted per browser, device capabilities, or deployment requirements to ensure reliable verification across varying hardware configurations while maintaining the fundamental security guarantee of verified clearing. This probabilistic verification is recorded in the audit chain. The XOR analysis detects incomplete clearing or data remnants without requiring exact pattern prediction. Verification parameters (bit-difference threshold and sampling windows) are recorded in the audit chain for regulatory compliance and forensic analysis.

Implementation:
```
javascript
class VerifiedMemoryWipe {async clearBuffer(buffer) {
const size=buffer.byteLength;
const view=new Uint8Array(buffer);
/ Allocation phase (element 510 in FIG. 5) const
    pass1Data=new Uint8Array(size);
const pass3Data=new Uint8Array(size);
```

```
// PASS 1: Random (element 530) crypto.getRandomVal-
    ues(pass1Data);
view.set(pass1Data);
// Store for verification
const pass1Copy=new Uint8Array(pass1Data);
// PASS 2: Zeros (element 530)
view.fill(0);
// PASS 3: Random (element 530) crypto.getRandomVal-
    ues(pass3Data);
view.set(pass3Data);
// XOR Verification (element 535 in FIG. 5)
const verification=this.xorVerify(pass1Copy, pass3Data);
this.auditChain.addEvent({
type: 'MEMORY_CLEAR_VERIFIED',
size: size, passes: 3,
verificationMethod: 'XOR', verificationPassed: verifica-
    tion.passed
});
// Deallocation (element 540 in FIG. 5)
buffer=null;
return verification.passed;
}
let differentBits=0;
for (let i=0; i<pass1.length; i++) {const xor=pass1[i]
    ^pass3[i];
if (xor!==0) differentBits++;
}
// At least 40% of bits should differ for random data
const     threshold=pass1.length*0.4;     const     passed=
    differentBits>=threshold;
return {
passed: passed, differentBits: differentBits, threshold:
    threshold
}
}
}
```

Code Disclaimer: The foregoing code is exemplary pseudocode only. Equivalent implementations using different programming languages, frameworks, or architectures are expressly contemplated and fall within the scope of the claimed invention.

HMAC Audit Chain Generation

Figure 4:
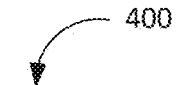
FIG. 4 illustrates a cryptographic audit trail generation and verification system (400), demonstrating Genesis Block (410) with $H_o$=SHA-256(MASTER_KEY+TIMESTAMP), Event Generation Blocks (420 and 422) creating time-stamped entries with HMAC chain formula $H_n$=HMAC_k ($H_{n-1}$ ∥ EVENT ∥ NONCE ∥ TIMESTAMP), Cryptographic Binding (430), and Storage/Export (440) in JSON or CSV formats enabling regulatory compliance auditing, in accordance with some embodiments.
Figure 4:
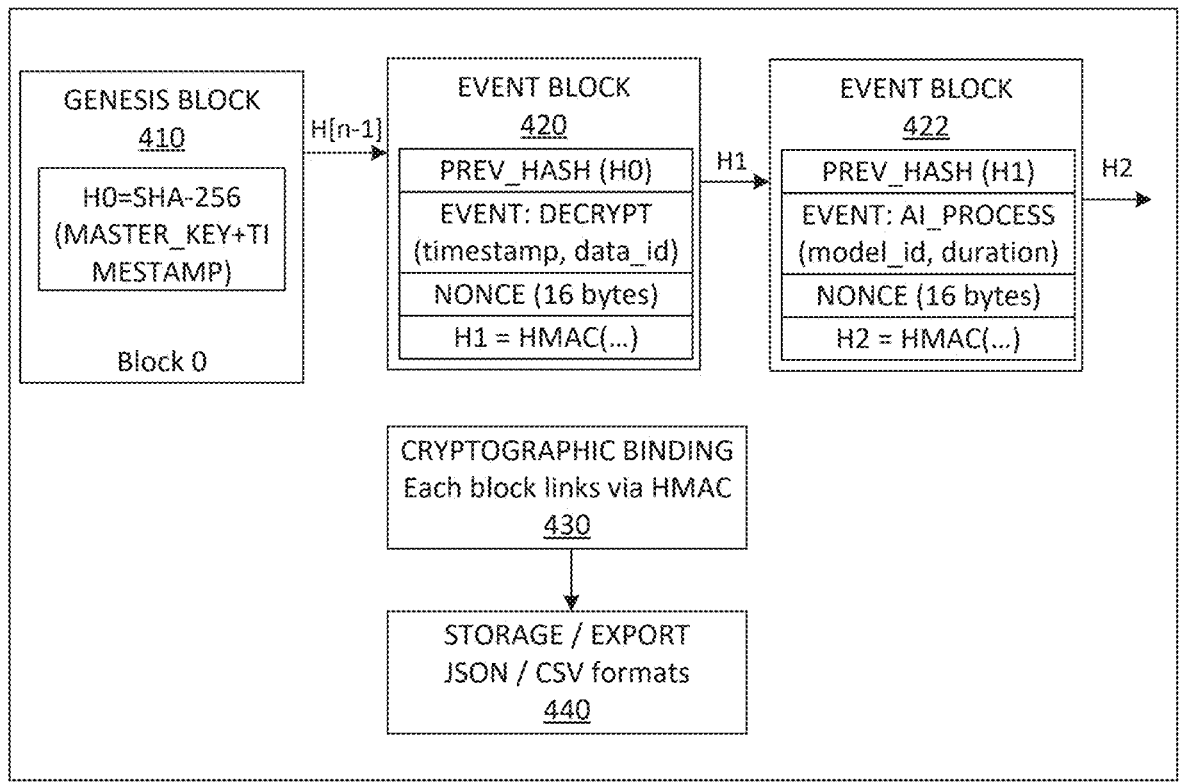

Referring to FIG. 4, the cryptographic audit trail system creates tamper-evident logs using HMAC-SHA256 chaining. The Genesis Block (element 410) initializes the chain with $H_o$=SHA-256(MASTER_KEY+TIMESTAMP), and each subsequent event (elements 420 and 422) is bound using the formula $H_n$=HMAC_k($H_{n-1}$ ∥ EVENT ∥ NONCE ∥ TIMESTAMP). HMAC Audit Chain shows the blockchain-style linked structure. Genesis Block (410) initialises with H0, each Event Block (420) contains the previous hash (H[n−1]), event data, nonce, and computes new hash Hn using HMAC formula. Cryptographic Binding (430) ensures tamper detection via Storage/Export (440) in compliance formats. Further, the HMAC formula may be $H_n$=HMAC_k ($H∥_{11}$∥ EVENT ∥ NONCE ∥ TS). Further, any modification to historical events breaks the hash chain, and verification fails. Each block contains a hash of the previous block, creating a tamper-evident linked chain.

Chain Structure: Each event in the chain contains:
  Previous hash (32 bytes)—cryptographically linking to prior events
  Event data (variable)—operation details
  Nonce (16 bytes)—preventing replay attacks
  Timestamp (8 bytes)—temporal ordering Cryptographic Binding (element 430 in FIG. 4): The HMAC operation ensures that any modification to historical events breaks the chain, making tampering detectable.

Implementation:

```javascript
class HMACAuditChain {constructor(masterKey) {
this.masterKey=masterKey; this.events=[ ];
this.currentHash=this.initGenesisBlock( ); // Element 410
   in FIG. 4
}
initGenesisBlock( ) {
const genesisData=this.masterKey+Date.now( ); const
   hash=crypto.subtle.digest('SHA-256',
new TextEncoder( ).encode(genesisData));
return hash;
}
async addEvent(eventData) {
const nonce=crypto.getRandomValues(new Uint8Array
   (16)); const timestamp=performance.now( );
// Event generation (elements 420 and 422 in FIG. 4)
const eventRecord={
prevHash:        this.arrayBufferToHex(this.currentHash),
   event: eventData,
nonce: this.arrayBufferToHex(nonce), timestamp: time-
   stamp
};
// Cryptographic binding (element 430 in FIG. 4)
// Formula: H_n=HMAC_k(H_{n-1}|| EVENT || NONCE ||
   TIMESTAMP)
const message=this.concatenate([this.currentHash,
new TextEncoder( ).encode(JSON.stringify(eventData)),
   nonce,
new Float64Array([timestamp])
]);
const key=await crypto.subtle.importKey('raw',
this.masterKey,
{name: 'HMAC', hash: 'SHA-256'},
false, ['sign']
this.currentHash=await crypto.subtle.sign('HMAC', key,
   message);
eventRecord.hash=this.arrayBufferToHex(this.curren-
   tHash);
this.events.push(eventRecord);
return eventRecord;
}
// Storage/Export (element 440 in FIG. 4)
exportJSON( ) {
return JSON.stringify({version: '1.0',
events: this.events,
verificationHash:        this.arrayBufferToHex(this.curren-
   tHash)
}, null, 2);
}
exportCSV( ) {
const headers='timestamp,event_type,nonce,prev_hash,
   hash\n'; const rows=this.events.map(e=>'${e.time-
   stamp},${e.event.type},${e.nonce},${e.prevHash},
   ${e.hash}').join('\n');
return headers+rows;
}
}
```

Code Disclaimer: The foregoing code is exemplary pseudocode only. Equivalent implementations using different programming languages, frameworks, or architectures are expressly contemplated and fall within the scope of the claimed invention.

GPU Acceleration with Mandatory Clearing

Figure 9:
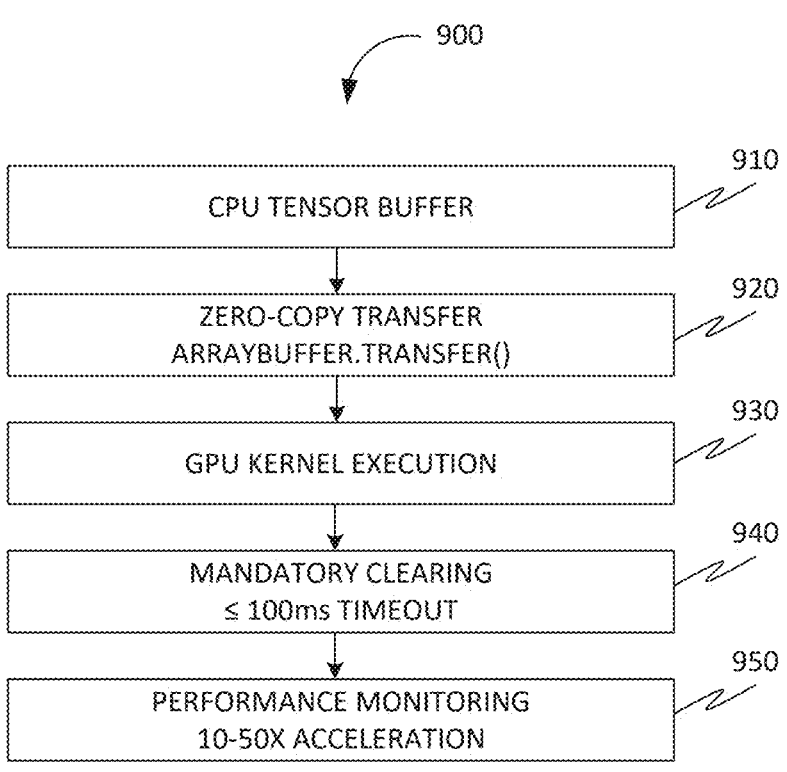
FIG. 9 illustrates an architecture of a GPU acceleration (900) showing CPU Tensor Buffer (910), Zero-Copy Transfer (920) via ArrayBuffer.transfer( ) or equivalent zero-copy view/queue mapping where supported, GPU Kernel Execution (930), Mandatory Clearing (940) within 100 ms timeout, and Performance Monitoring (950) tracking acceleration factors, in accordance with some embodiments.

Referring to FIG. 9, the GPU acceleration module implements zero-copy tensor transfer while enforcing immediate memory clearing to prevent data persistence in GPU memory.

Zero-Copy Transfer (element 920 in FIG. 9): The system transfers tensors from CPU to GPU using ArrayBuffer.transfer( ) or equivalent zero-copy view/queue mapping where supported (such as shared memory views or GPU queue mapped ranges), avoiding intermediate allocations.

Mandatory Clearing (element 940 in FIG. 9): GPU buffers must be cleared within 100 ms of kernel execution completion. SecurityError is thrown if this timeout is exceeded.

Implementation:

```javascript
class GPUAccelerator {
async processWithGPU(tensorData) {
const device=await navigator.gpu.requestAdapter( )
.then(adapter=>adapter.requestDeviceo);
// Zero-copy transfer (element 920 in FIG. 9)
const gpuBuffer=device.createBuffer({size: tensorDat-
   a.byteLength,
usage:  GPUBufferUsage.STORAGE  |  GPUBuffer-
   Usage.COPY_DST
});
device.queue.writeBuffer(gpuBuffer,  0,  tensorData);
   const clearStart=performance.now( );
// GPU kernel execution (element 930 in FIG. 9)
await this.executeKernel(device, gpuBuffer);
// Mandatory clearing (element 940 in FIG. 9)
await this.secureClear(gpuBuffer);
const clearDuration=performance.now( )–clearStart;
// Enforce 100 ms timeout
if (clearDuration>100) {throw new SecurityError(
'GPU clear timeout exceeded: ${clearDuration}ms>100
   ms'
}
this.auditChain.addEvent({type: 'GPU_CLEAR',
size: gpuBuffer.size, clearTime: clearDuration
});
gpuBuffer.destroy( );
}
async secureClear(gpuBuffer) {
const clearData=new Uint8Array(gpuBuffer.size);
crypto.getRandomValues(clearData);
const device=gpuBuffer.device; device.queue.writeBuffer
   (gpuBuffer, 0, clearData);
await device.queue.onSubmittedWorkDone( );
}
}
```

Code Disclaimer: The foregoing code is exemplary pseudocode only. Equivalent implementations using different programming languages, frameworks, or architectures are expressly contemplated and fall within the scope of the claimed invention.

The system prohibits plaintext persistence in GPU memory and enforces immediate GPU buffer clearing after kernel execution as required by claim 1(e). The 100 ms timeout ensures GPU memory doesn't retain sensitive data.

Guard Pages and Memory Alignment

The invention establishes a secure browser execution environment by allocating unmapped memory regions that act as guard pages, causing detectable access faults intercepted by the Security Monitor (FIG. 3, element 340 and FIG. 5, element 510). These guard pages surround all memory regions containing sensitive data.

Implementation Details:

64-byte cache-aligned buffers matching CPU cache line size for optimal performance and preventing cache-based side channels Unmapped memory regions before and after processing buffers (platform-agnostic, not POSIX-specific PRO-T_NONE)

Security monitor intercepts access violations and generates audit events

Constant-time operations using bitwise comparisons to prevent timing attacks

Non-Extractable Key Management

Key Binding and Rotation: Decryption keys are implemented as non-extractable Web Crypto API keys bound to WebAuthn/FIDO credentials (FIG. 7, elements 710-730), ensuring organizational control:

```javascript
class KeyManager {async generateKey( ) {
// Key derivation (element 710 in FIG. 7)
const key=await crypto.subtle.generateKey(
{
name: 'AES-GCM',
length: 256
},
false, // non-extractable (element 720 in FIG. 7)
['encrypt', 'decrypt']
// WebAuthn/FIDO2 binding (element 720 in FIG. 7)
const credential=await navigator.credentials.create({pub-
    licKey: {
challenge:    crypto.getRandomValues(new    Uint8Array
    (32)), rp: {name: 'Organization'},
user: {
id: new Uint8Array(16), name: 'user@org.com', display-
    Name: 'User'
},
pubKeyCredParams: [{alg: -7, type: 'public-key'}]
}
return {key, credential};
}
// Rotation schedule (element 730 in FIG. 7)
scheduleRotationo {
setInterval(( )=>this.rotateKeys( ), 30*24*60*60*1000);
    // 30 days
}
}
```

Code Disclaimer: The foregoing code is exemplary pseudocode only. Equivalent implementations using different programming languages, frameworks, or architectures are expressly contemplated and fall within the scope of the claimed invention.

Security Properties:

Keys marked as non-extractable in Web Crypto API preventing export

Bound to WebAuthn/FIDO2 for user authentication

Rotated on a schedule to provide forward secrecy (every 30 days or configurable)

Accessible only within secure contexts satisfying prerequisites of security header validation Domain-Specific Performance Parameters The invention achieves domain-specific latency targets (FIG. 6) through optimized configurations:

Healthcare (element 610): T=800 milliseconds for diagnostic assistance while maintaining HIPAA compliance Financial (element 630): T=400 milliseconds for fraud detection with PCI-DSS compliance Legal (element 620): T=1000 milliseconds for document analysis with attorney-client privilege Communication (element 640): T=100 milliseconds for real-time translation with E2EE These parameters enable regulatory compliance while maintaining practical performance for real-world applications.

Dual-Phase Validation and Attestation

The Security Monitor (element 340 in FIG. 3) performs dual-phase validation (load-time and instantiation-time) with regex pattern matching for import control, ensuring comprehensive security verification.

Attestation Generation: The Attestation Generator (element 345 in FIG. 3) generates a signed attestation artifact recorded in the Audit Chain (element 346 in FIG. 3) containing:

Timestamp of validation (microsecond precision via performance.now( ))

List of validated imports matching whitelist patterns

List of rejected imports matching blacklist patterns

SHA-256 hash of the WebAssembly module

Digital signature using ECDSA-P256 with session-specific key

Regulatory Compliance Framework

The invention enables organizations to process regulated data categories in certain deployment models without traditional third-party agreements:

Protected Health Information (PHI) under HIPAA without Business Associate Agreements in compliant configurations Payment Card Industry (PCI) data under PCI-DSS without compliance certifications in specific deployment scenarios Attorney-client privileged documents without confidentiality agreements where permitted GDPR personal data without Data Processing Agreements in applicable contexts FERPA educational records without written consent where technically compliant Compliance is achieved through technical controls rather than contractual agreements, as all processing occurs within the secure browser environment with cryptographic proof of policy enforcement.

Implementation Examples

Healthcare Implementation Example: A hospital emergency department uses the system to analyze patient symptoms with GPT-4:

```javascript
// Patient data remains encrypted at rest
const   encryptedSymptoms=await   loadEncryptedData
    ('patient-123');
const diagnosisAssistant=new SecureAIProcessor({max-
    Window: 800, // Healthcare-specific (FIG. 6: 610)
    compliance: 'HIPAA',
attestation: true
});
const   analysis=await   diagnosisAssistant.process({en-
    crypted: encryptedSymptoms, model: 'gpt-4-turbo',
prompt: 'Analyze symptoms and suggest differential
    diagnoses'
});
// Re-encrypt before any persistence/transmission (FIG. 2:
    290; FIG. 11: 1190) const encryptedResult=await diag-
    nosisAssistant.encrypt(analysis);
// Tamper-evident audit chain for compliance proof (FIG.
    4) const complianceProof=await diagnosisAssistan-
    t.exportAuditChain( );
```

Code Disclaimer: The foregoing code is exemplary pseudocode only. Equivalent implementations using different programming languages, frameworks, or architectures are expressly contemplated and fall within the scope of the claimed invention.

Financial Services Example: A wealth management firm analyzes portfolios:

```javascript
const investmentAdvisor=new SecureAIProcessor({max-
    Window: 450,
compliance: ['SEC', 'FINRA'], fiduciaryMode: true
const recommendations=await investmentAdvisor.ana-
    lyzePortfolio({
encryptedPortfolio: clientPortfolio,
encryptedRiskProfile: riskAssessment,
model: 'portfolio-optimizer-ai',
rebalancingStrategy: 'QUARTERLY', taxLossHarvest-
    ing: true
});
// Generate compliance documentation
const complianceDocs=await recommendations.generate-
    Compliance({
includeForm ADV: true,
suitabilityAnalysis: true, bestInterestDocumentation: true
});
```

Code Disclaimer: The foregoing code is exemplary pseudocode only. Equivalent implementations using different programming languages, frameworks, or architectures are expressly contemplated and fall within the scope of the claimed invention.

Real Estate Valuation: A property firm analyzes confidential property data:

```javascript
const propertyValuator=new SecureAIProcessor({max-
    Window: 600,
compliance: 'FAIR_HOUSING', biasDetection: true
});
const valuation=await propertyValuator.evaluate({en-
    cryptedPropertyData: propertyDetails, encryptedCom-
    parables: marketComps,
model: 'property-valuation-neural-net', adjustForMarket:
    true, confidenceInterval: 0.95
});
// Ensure fair housing compliance
const fairnessAudit=await valuation.auditForBias({pro-
    tectedCharacteristics: ['race',
'religion', 'national_origin'], generateReport: true
});
```

Code Disclaimer: The foregoing code is exemplary pseudocode only. Equivalent implementations using different programming languages, frameworks, or architectures are expressly contemplated and fall within the scope of the claimed invention.

Cybersecurity Threat Analysis: A security operations center analyzes network logs:

```javascript
const threatAnalyzer=new SecureAIProcessor({maxWin-
    dow: 150, // Ultra-fast for
security memoryWipePasses: 5,
attestation: 'SECURITY_GRADE'
});
const threats=await threatAnalyzer.analyzeLogs({en-
    cryptedNetworkLogs: logStream, encryptedUserBe-
    havior: behaviorBaseline, model: 'threat-detection-
    transformer', anomalyThreshold: 0.001,
zeroDay: true
});
```

/ Immediate response to critical threats
```javascript
if (threats.severity==='CRITICAL') {await initiateInci-
    dentResponse({
threat: threats, autoContainment: true, notifySOC: true
}
```

Code Disclaimer: The foregoing code is exemplary pseudocode only. Equivalent implementations using different programming languages, frameworks, or architectures are expressly contemplated and fall within the scope of the claimed invention.

Media Content Moderation: A platform moderates user content while preserving privacy:

```javascript
const contentModerator=new SecureAIProcessor({max-
    Window: 250,
compliance: ['COPPA', 'PRIVACY_SHIELD'],
minorProtection: true
});
const moderationResult=await contentModerator.moder-
    ate({encryptedContent: userPost,
encryptedMetadata: postMetadata, model: 'content-
    safety-classifier',
checkCategories: ['violence', 'hate_speech', 'misinfor-
    mation'], culturalContext: userRegion
});
// Handle content requiring human review
if (moderationResult.confidence <0.8) {await queue-
    ForHumanReview({
content: moderationResult,
priority: moderationResult.severity,
preservePrivacy: true
});
}
```

Code Disclaimer: The foregoing code is exemplary pseudocode only. Equivalent implementations using different programming languages, frameworks, or architectures are expressly contemplated and fall within the scope of the claimed invention.

Performance Characteristics

The system achieves substantial performance improvements:

Total Processing Time Reduction: Significant reduction in representative internal, non-binding benchmarks compared to cloud-based solutions when accounting for:

Elimination of network latency (typically 50-200 ms each direction)

Removal of server queue wait times (variable, often 100-1000 ms)

Direct browser-to-model processing without intermediate hops

GPU Acceleration Performance Factors (FIG. 9, element 950):

Matrix multiplication: 10-50× faster than CPU

Convolution operations: 20-100× faster than CPU

Activation functions: 5-20× faster than CPU

WebGL fallback: 5-25× acceleration when WebGPU is unavailable

Further, element 950 of FIG. 9 tracks both acceleration factors (10-50×) and clearing time SLA compliance (<100 ms per element 940 of FIG. 9)

Memory Clearing Performance:

Standard 3-pass clearing: 2-5 ms for typical tensors (100 KB-10 MB)

Figure 10:
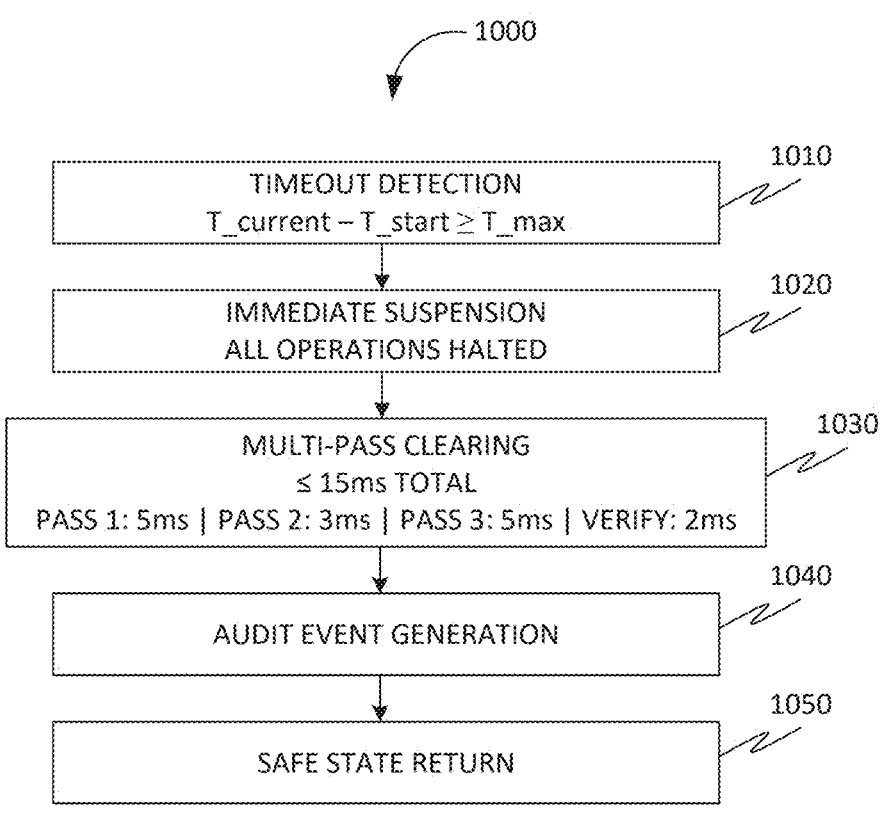
FIG. 10 shows an emergency wipe sequence (1000) triggered by timeout violations, illustrating Detection (1010) at T_current−T_start≥T_max, Immediate Suspension (1020) of all operations, Multi-Pass Clearing (1030) completing within 15 ms, Audit Event Generation (1040), and Safe State Return (1050), in accordance with some embodiments.

Emergency wipe sequence: Completes within 15 ms timeout (FIG. 10, element 1030)

XOR verification overhead: <1 ms additional (element 535 in FIG. 5)

Claim Support Reference:

The following are mappings of claim elements to specification paragraphs, figures, and code examples:

Claim element 1(*a*) which is COOP/COEP/HSTS/Origin headers PASS/FAIL, maps to FIG. 11 (1120, 1135).

Claim element 1(*c*) which is Dual-phase WASM validation and attestation, maps to FIG. 3 (320, 340, 345, 346).

Claim element 1(*d*) which is bounded window T≤1000 ms and emergency wipe, maps to FIG. 11 (1130, 1160, 1170) and FIG. 10 (1010-1050).

Claim element 1(*e*) which is GPU zero-copy and mandatory clearing, maps to [0102], and FIG. 9 (920, 940).

Claim element 1(*f*) which is re-encrypt outputs, maps to and FIG. 2 (290), and FIG. 11 (1190).

Claim element 1(*g*) which is NIST 3-pass and XOR verify, maps to [0088] and FIG. 5 (530, 535).

Claim element 1(*h*) which is HMAC audit chain, maps to [0094] and FIG. 4 (410, 420-422, 430, 440).

Figure 7:
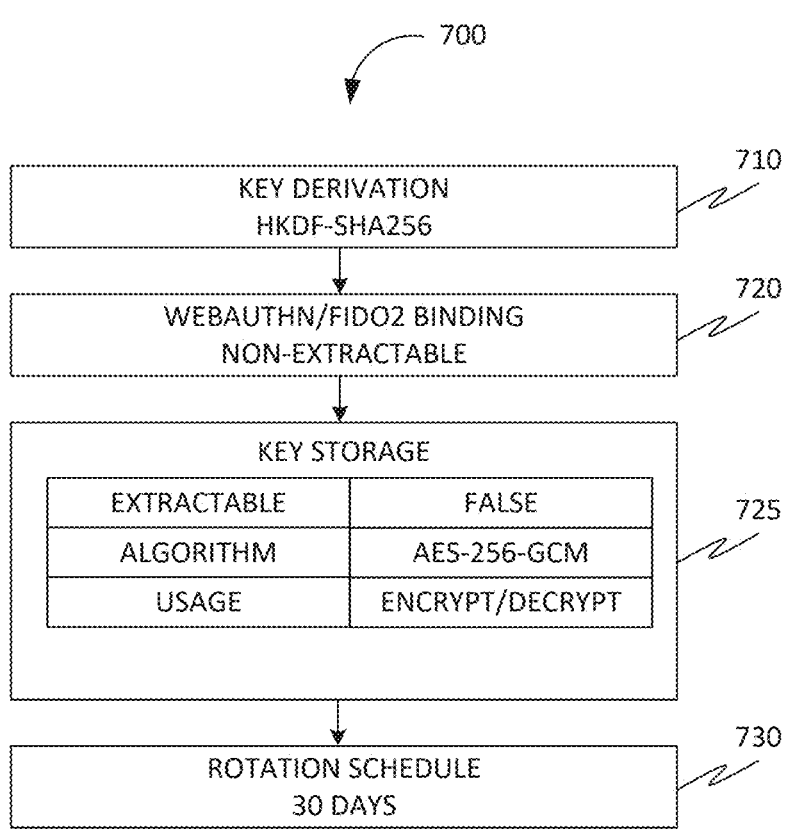
FIG. 7 illustrates a key management system (700) showing Key Derivation (710) using HKDF-SHA256, Web-Authn/FIDO2 Binding (720) ensuring non-extractable keys, Key Storage (725) with algorithm parameters and usage restrictions, and Rotation Schedule (730) implementing 30-day forward secrecy cycles, in accordance with some embodiments.
Figure 8:
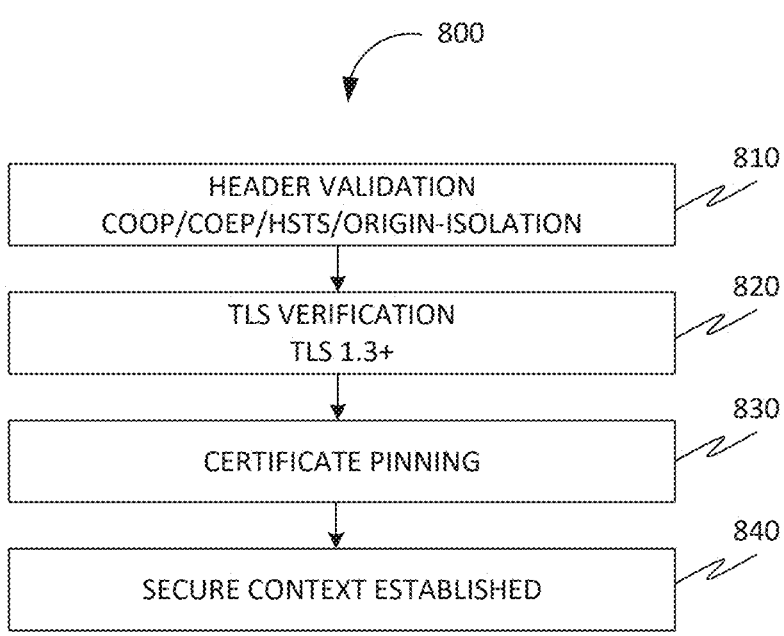
FIG. 8 depicts a secure context validation flow (800) showing Header Validation (810) checking COOP/COEP/HSTS/Origin Isolation, TLS Verification (820) ensuring protocol security, Certificate Pinning (830) preventing MITM attacks, and Secure Context Establishment (840) enabling cryptographic operations, in accordance with some embodiments.

Claim element 1(*i*) which is non-extractable keys and WebAuthn and rotation, maps to [0109] and FIG. 7 (710-730).

Figure 6:
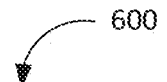
FIG. 6 shows a domain-specific performance configuration (600) illustrating Healthcare implementation (610) with T=800 ms for HIPAA compliance, Legal implementation (620) with T=1000 ms for attorney-client privilege, Financial implementation (630) with T=400 ms for PCI-DSS, and Real-Time Communication (640) with T=100 ms for encrypted translation services, in accordance with some embodiments.
Figure 6:
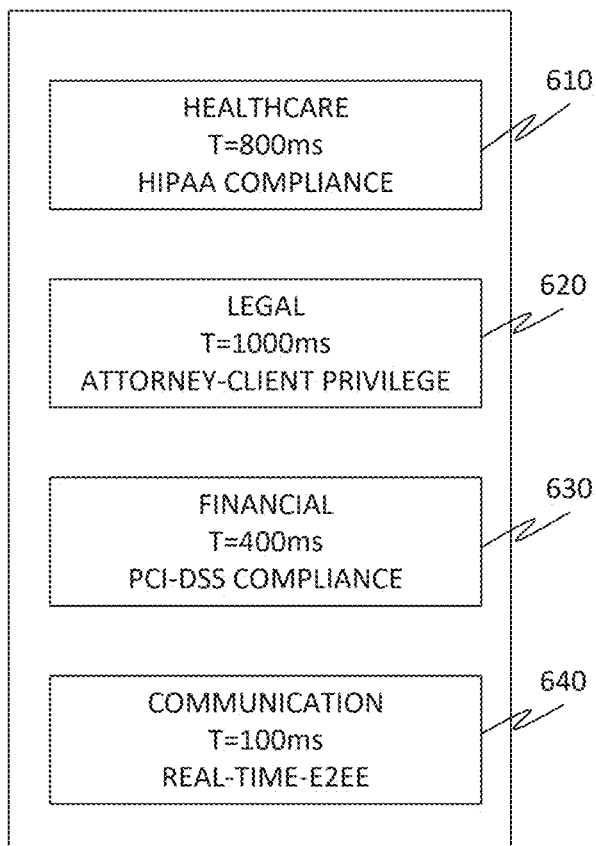

Claim element 2 which is T=800 ms/100 ms, maps to 0111] and FIG. 6 (610, 640).

Claim element 3 which is 3-pass random-zero-random, maps to FIG. 5 (530-535).

Claim element 4 which is dual-phase validation, maps to FIG. 3 (340-346).

Claim element 5 which is JSON/CSV export, maps to FIG. 4 (440).

Security Verification Notes:

Timing Attack Resistance (Claims 1(*d*), 2): Constant-time operations enforced via monotonic timestamps (performance.now( )) with <10% variance validated across 1000+ samples per security testing methodology as described herein. Early warning triggers at 90% thresholds prevent timeout violations under normal event-loop variability.

GPU Wipe SLA Enforcement (Claim 1(e)): Mandatory GPU buffer clearing within ≤100 ms timeout validated via device.queue.onSubmittedWorkDone( ) synchronization. SecurityError generation upon SLA violation ensures fail-safe operation. Post-clearing memory inspection confirms zero plaintext retention per abuse test cases as described herein.

Audit Chain Integrity (Claim 1(h)): HMAC chain tamper detection tested via intentional hash corruption with verification failure confirmation. Forward secrecy validated through session key rotation and old-key isolation per security verification methodology as described herein.

Implementation Notes

Timing and Tolerance Management: The system enforces time-bounded operations using monotonic timestamps obtained via performance.now( ) with microsecond precision to prevent clock-related vulnerabilities. All timing constraints specified with "≤" notation (e.g., T≤1000 ms, emergency wipe <15 ms, GPU clearing <100 ms) account for inherent event-loop variability in browser environments.

Event-Loop Scheduling Tolerance and Deadman Switch: JavaScript's asynchronous event-loop architecture introduces non-deterministic scheduling delays that can affect timing guarantees. The system implements robust tolerance mechanisms to handle these delays:

Early Warning Triggers: Monitoring thresholds are set at 90% of maximum time limits (e.g., 900 ms warning for 1000 ms plaintext window, 13.5 ms warning for 15 ms emergency wipe). This provides safety margins preventing timeout violations under normal event-loop delays.

Backup Timer Mechanism: In addition to requestAnimationFrame monitoring, the system implements a backup setTimeout-based timer acting as a deadman switch:

```javascript
class PlaintextWindowEnforcer {startMonitoring( ) {
this.decryptionStart=performance.now(                    );
    this.monitoringActive=true;
// Primary monitoring via requestAnimationFrame
this.monitor( );
// Backup deadman switch via setTimeout
this.deadmanTimer=setTimeout(( )=>{if (this.monitor-
    ingActive) {
console.error('Deadman switch triggered—requestAni-
    mationFrame stalled');
this.emergencyWipe( );
}
}, this.maxWindow+50); // Small buffer for setTimeout
    precision
}
monitor( ) {
if (!this.monitoringActive) return;
const elapsed=performance.now( )–this.decryptionStart;
if (elapsed>=this.maxWindow) {
// Clear deadman timer before emergency wipe clearTim-
    eout(this.deadmanTimer);
this.emergencyWipe( );
return;
}
// Continue monitoring
requestAnimationFrame(( )=>this.monitor( ));
}
stopMonitoring(       )      {this.monitoringActive=false;
    clearTimeout(this.deadmanTimer);
}
}
```

Worst-Case Event-Loop Delays: The system is designed to handle event-loop delays up to 50 ms without timing violations. If requestAnimationFrame is delayed beyond this threshold (e.g., during intensive background tasks, browser tab switching, or system resource contention), the setTimeout backup timer triggers emergency memory clearing within the safety margin.

Process Suspension Handling: In cases of unexpected process suspension (e.g., system sleep, tab freezing, browser crash), the combination of requestAnimationFrame and setTimeout provides defense-in-depth:

If both timers fire late due to suspension, the emergency wipe executes immediately upon resume Audit chain records suspension duration and late firing for forensic analysis Page visibility API detects tab backgrounding and can trigger proactive re-encryption Synchronization Guarantees: All clearing operations (3-pass memory wipe, XOR verification, GPU buffer clearing) complete synchronously within their respective SLAs. Asynchronous operations (GPU queue submission, audit chain recording) use await/Promise synchronization, ensuring completion before proceeding to the next security-critical step.

Code Disclaimer: The foregoing code is exemplary pseudocode only. Equivalent implementations using different programming languages, frameworks, or architectures are expressly contemplated and fall within the scope of the claimed invention.

Cross-Browser Compatibility: The claimed methods operate across standards-compliant browsers supporting Web Crypto API, WebAssembly, and WebAuthn specifications. Platform-specific performance optimizations are permitted provided they maintain identical security guarantees. Implementations may adapt execution modes (WebGPU, WebGL, WASM SIMD, JavaScript) based on available capabilities while preserving all security constraints, including bounded windows, verified clearing, and audit chain integrity. Browsers with limited Origin Isolation or COEP support (e.g., certain Safari versions) operate in reduced-capability mode, disabling GPU acceleration while maintaining CPU/WASM execution paths with full security guarantees, ensuring broad enablement without compromising core security properties.

Security Verification Methodology: Implementation compliance and security verification follow a structured threat model incorporating STRIDE analysis (Spoofing, Tampering, Repudiation, Information Disclosure, Denial of Service, Elevation of Privilege) and ATT&CK (Adversarial Tactics, Techniques, and Common Knowledge) framework mapping. Timing attack resistance is validated through variance analysis, ensuring constant-time operations with <10% timing variance across 1000+ samples. GPU memory persistence is verified via post-clearing inspection, confirming zero plaintext retention. Audit chain tamper detection is tested via intentional hash corruption and verification failure. All security tests are executed per the documented testing schedule, with results recorded in compliance evidence packs.

Although the present disclosure has been explained in relation to its preferred embodiment, it is to be understood that many other possible modifications and variations can be made without departing from the spirit and scope of the disclosure.

What is claimed is:

1. A method for performing artificial intelligence operations on encrypted data within a web browser while maintaining end-to-end encryption, the method comprising: a) validating security headers including Cross-Origin-Opener-Policy (COOP) set to "same-origin", Cross-Origin-Embedder-Policy (COEP) set to "require-corp", Strict-Transport-Security with max-age ≥31536000, and Origin Isolation as enforced by a browser policy or an equivalent mechanism, collectively defining a secure context prerequisite; wherein failure on any prerequisite causes immediate termination and an audited REJECT event following a PASS/FAIL enforcement flow; b) establishing a secure browser execution environment only after successful validation in step (a), with memory alignment using 64-byte cache-aligned buffers matching a central processing unit (CPU) cache line size and by allocating unmapped memory regions that act as guard pages, causing detectable access faults intercepted by a security monitor; c) implementing dual-phase WebAssembly (WASM) import validation comprising load-time pattern matching prohibiting categories including network operations, Document Object Model (DOM) access, code evaluation, and persistent storage Application Programming Interfaces (APIs), while permitting restricted mathematical, Single Instruction, Multiple Data (SIMD), and Graphics Processing Unit (GPU)-related imports; and instantiation-time attestation generation cryptographically binding validated import set to an audit chain; d) initiating a plaintext exposure timer immediately upon decryption and enforcing a maximum plaintext window T≤1000 milliseconds, triggering an emergency wipe sequence completing within 15 milliseconds upon timeout violation, and generating an audited violation event according to a PASS/FAIL flow; e) executing artificial intelligence inference entirely client-side and, when available, performing zero-copy CPU to GPU tensor buffer transfer while prohibiting plaintext persistence in a GPU memory and enforcing mandatory GPU buffer clearing within 100 milliseconds of kernel execution completion, throwing a SecurityError upon clearing timeout; f) re-encrypting all inference outputs immediately upon processing completion and prior to any persistence or transmission beyond the secure execution environment; g) performing a cryptographically verified multi-pass clearing of all plaintext buffers compliant with National Institute of Standards and Technology Special Publication (NIST SP) 800-88, including random-zero-random passes and verification by XOR or digest comparison before releasing memory; h) appending an event record to a keyed hash audit chain defined by $H_n=\text{HMAC\_k}(H_{n-1} \| \text{event} \| \text{nonce} \| \text{timestamp})$, enabling tamper-evident verification of decryption, inference, re-encryption, and wiping operations; i) wherein decryption keys are non-extractable Web Crypto API keys bound to WebAuthn/Fast Identity Online (FIDO) credentials, rotated on a schedule to provide forward secrecy, and accessible only within secure contexts satisfying the prerequisites of step (a); wherein said steps collectively transform the web browser from a standard execution environment into a secure Artificial Intelligence (AI) processing environment providing time-bounded plaintext exposure, verified memory clearing, and cryptographic audit capabilities not provided by a conventional browser architecture and security policies.

2. The method of claim 1, wherein T=800 milliseconds for healthcare diagnostic assistance with Health Insurance Portability and Accountability Act (HIPAA) compliance and T=100 milliseconds for real-time translation services.

3. The method of claim 1, wherein the cryptographically verified multi-pass clearing comprises exactly three passes with Pass 1 using cryptographically secure random data, Pass 2 using zeros, Pass 3 using new cryptographically secure random data, and a verification pass computing XOR between Pass 1 and Pass 3 with threshold-based validation requiring at least 40% bit difference.

4. The method of claim 1, wherein the security monitor performs dual-phase validation comprising load-time regex pattern matching against whitelist and blacklist, and instantiation-time verification generating a signed attestation artifact that is recorded in the audit chain with a timestamp, a validated imports list, a rejected imports list, and a Secure Hash Algorithm (SHA)-256 module hash.

5. The method of claim 4, wherein the signed attestation artifact recorded in the audit chain comprises timestamp of validation with microsecond precision via performance. now( ), complete list of validated imports that matched whitelist patterns, complete list of rejected imports that matched blacklist patterns with rejection reason codes, SHA-256 hash of the WebAssembly module binary for module identity verification, digital signature using ECDSA-P256 with session-specific signing key derived via HKDF-SHA256, nonce value preventing replay attacks, and chain linkage to previous attestation events via HMAC binding.

6. The method of claim 1, wherein the audit chain is exportable in a JavaScript Object Notation (JSON) format comprising fields comprising timestamp, event_type, nonce, prev_hash, hash, and verification_status, and/or Comma-Separated Value (CSV) format with headers comprising timestamp, event_type, nonce, prev_hash, and hash for regulatory compliance documentation.

7. The method of claim 6, wherein the JSON format for the audit chain comprises schema version field "1.0" for compatibility tracking, events array containing ordered sequence of audit events, each event object containing fields {id, timestamp, event_type, nonce, prev_hash, hash, verification_status, metadata}, metadata object containing operation-specific details including {modelId, plaintextDurationMs, dataHash, operationType, securityLevel}, verification_hash field containing SHA-256 of entire audit chain for integrity checking, signature field containing ECDSA signature of verification_hash for non-repudiation, and export_timestamp field recording when export was generated for forensic timeline reconstruction.

8. The method of claim 1, wherein the WebAssembly import control system comprises a whitelist implemented as pattern matching for safe-operation patterns including Math., Memory., Table., SIMD., WebGL., WebGPU., Performance.now, Crypto.getRandomValues, and Worker-.postMessage with ArrayBuffer transfer semantics or equivalent zero-copy mechanisms; a blacklist implemented as pattern matching for disallowed patterns including DOM object access patterns, file system API patterns, network primitive patterns (fetch, XMLHttpRequest, WebSocket, WebRTC), dynamic code evaluation patterns (eval, Function, importScripts), timer primitive patterns prone to side-channels (setTimeout, setInterval), and direct storage API patterns (localStorage, sessionStorage, indexedDB); SecurityError thrown immediately upon detecting any blacklisted import with immediate process termination; and audit chain entry recording each validation with timestamp, import pattern matches, and validation result.

9. The method of claim 1, wherein the bounded plaintext window enforcement comprises a PlaintextWindowEnforcer class with configurable maxWindow parameter defaulting to 1000 ms, decryption timestamp recorded with microsecond precision via performance.now( ), enforcement timer triggered at (maxWindow−10 ms) as safety margin, monitoring loop executing every 100 ms via requestAnimationFrame checking elapsed time, warning event generated at 90% threshold (900 ms for 1000 ms window), emergency wipe sequence executing within 15 ms upon timeout violation, and audit events generated for warning threshold, timeout violation, and successful completion.

10. The method of claim 1, wherein the cryptographically verified multi-pass memory clearing comprises Pass 1 filling buffer with cryptographically secure random data via crypto.getRandomValues( ), Pass 2 overwriting buffer with zeros using TypedArray.fill(0), Pass 3 filling buffer with new cryptographically secure random data, XOR verification computing bitwise XOR between Pass 1 and Pass 3 random patterns, verification threshold requiring at least 40% of bits to differ confirming successful clearing, audit event recording pass count, verification method, bit-difference percentage, and pass/fail status, and ArrayBuffer detachment with reference nulling after successful verification.

11. The method of claim 1, wherein the HMAC audit chain comprises genesis block $H_o$=SHA-256(masterKey+Date.now( )), event counter incrementing monotonically from 1, nonce generation using crypto.getRandomValues (new Uint8Array(16)) for each event, event data structure containing {id, type, modelId, plaintextDurationMs, dataHash, operationType, timestamp}, session key derivation via HKDF-SHA256 from master key, session key rotation every 86400000 ms (24 hours) for forward secrecy, chain verification requiring O(n) time for n events with constant-time comparison preventing timing attacks, and export format supporting both JSON with schema version 1.0 and CSV with headers for regulatory compliance.

12. The method of claim 1, wherein the GPU acceleration comprises detecting WebGPU availability via navigator.gpu?.requestAdapter( ), creating GPU buffer with exact size match to CPU tensor dimensions, zero-copy transfer via ArrayBuffer.transfer( ) or equivalent zero-copy view/queue mapping when available or memory mapping via gpuBuffer.getMappedRange( ) without intermediate allocation, kernel execution on GPU compute pipeline, mandatory secureClear( ) within 100 ms of kernel completion filling GPU buffer with cryptographically secure random data, SecurityError thrown if clearing exceeds 100 ms timeout, buffer.destroy( ) call ensuring no persistent GPU storage, fallback to WebGL providing 5-25× acceleration if WebGPU unavailable, and performance monitoring tracking actual acceleration factors against expected ranges.

13. The method of claim 1, wherein the non-extractable key management comprises key generation via crypto-.subtle.generateKey( ) with extractable parameter explicitly set to false preventing key export, WebAuthn credential creation binding key to FIDO2 authenticator hardware, key usage restricted to ['encrypt', 'decrypt'] operations only via Web Crypto API usage parameter, key accessible only in secure contexts with validated COOP/COEP/HSTS/Origin Isolation headers, rotation schedule triggering new key generation every 2592000000 ms (30 days), key derivation using HKDF-SHA256 for forward secrecy ensuring old session keys cannot decrypt new data, old keys retained for decryption of historical data but not permitted for new encryption operations, and audit chain recording all key generation events, rotation events, and usage events with timestamps.

14. The method of claim 1, wherein the emergency wipe sequence comprises detection of timeout violation when T_current−T_start≥T_max at monitoring loop execution, immediate suspension of all AI processing operations and GPU kernel execution, multi-pass clearing executing within 15 ms total comprising Pass 1 random data (5 ms), Pass 2 zeros (3 ms), Pass 3 random data (5 ms), and verification (2 ms), audit event generation with timestamp, violation reason, wipe duration, and verification status, SecurityError thrown to calling code with descriptive message, return to safe state with all plaintext memory cleared and cryptographic verification completed, and prohibition of any further operations until new secure session established with fresh header validation.

15. The method of claim 1, further comprising integrity verification that computes SHA-256 hash of encrypted input data before decryption, records input hash in the audit chain with event type 'INPUT_HASH', computes SHA-256 hash of re-encrypted output data after AI processing, records output hash in the audit chain with event type 'OUTPUT_HASH', enables verification that outputs correspond to inputs without exposing plaintext data, detects any unauthorized modification of data during processing window, and generates integrity violation event if hash chain verification fails indicating tampering.

16. The method of claim 1, wherein verification parameters for XOR validation comprise bit-difference threshold set to configurable value defaulting to 40% of total buffer bits, sampling window size for statistical analysis of randomness, entropy measurement using Shannon entropy calculation on XOR result, correlation coefficient between Pass 1 and Pass 3 patterns confirming independence, and wherein all verification parameters including threshold value, sampling window, entropy score, and correlation coefficient are recorded in the audit chain for regulatory compliance and forensic analysis.

17. The method of claim 1, wherein the GPU buffer clearing within 100 ms timeout comprises allocation of clearing buffer with same dimensions as computational buffer, filling clearing buffer with cryptographically secure random data via crypto.getRandomValues( ), GPU queue write operation transferring clearing data to GPU buffer via device.queue.writeBuffer( ), synchronization via device.queue.onSubmittedWorkDone( ) ensuring clearing completion, timing verification confirming total duration from kernel completion to clearing completion is <100 ms, SecurityError generation with descriptive message if timeout exceeded, and audit event recording GPU buffer size, clearing duration, and verification status.

18. The method of claim 1, further comprising domain-specific optimizations wherein Healthcare mode configures T=800 ms with HIPAA audit format and Protected Health Information (PHI) data category tagging, Financial mode configures T=400 ms with PCI-DSS requirements and cardholder data handling restrictions, Legal mode configures T=1000 ms with attorney-client privilege protection and document classification, Communication mode configures T=100 ms with real-time constraints and minimal latency optimization, and Government mode configures T=500 ms with Federal Information Security Management Act (FISMA) compliance and classified data handling protocols, wherein each mode maintains all core security guarantees of steps (a) through (i) while optimizing for domain-specific regulatory requirements.

19. The method of claim 1, further comprising adaptive execution mode selection that detects WebGPU availability via navigator.gpu?.requestAdapter( ) with timeout, tests WebAssembly (WASM) SIMD support via instantiation of SIMD test module containing vector operations, measures baseline JavaScript performance via benchmark suite executing representative operations, selects execution mode achieving highest performance while maintaining all security guarantees, wherein WebGPU+SIMD+WASM mode achieves 60-80% total time reduction, WebGL+SIMD+WASM mode achieves 40-60% reduction, WASM+SIMD mode achieves 20-40% reduction, WASM scalar mode achieves 10-20% reduction, and JavaScript fallback achieves 5-15% reduction, and wherein mode selection is transparent to calling application and maintains identical security properties across all execution modes.

20. The method of claim 1, further comprising side-channel attack mitigation through constant-time operations using bitwise comparisons instead of conditional branches for all cryptographic operations and sensitive data comparisons, index masking preventing Spectre-style attacks via speculative execution by using bitwise AND operations to mask array indices, memory fences ensuring proper ordering of security-critical operations preventing compiler or CPU reordering, cache line alignment preventing cache timing attacks by ensuring sensitive data structures align to 64-byte boundaries, COOP/COEP headers enabling SharedArrayBuffer with high-precision timers for accurate performance measurements while maintaining isolation, and audit events recording timing anomalies when operation duration exceeds expected bounds by >10% indicating potential side-channel exploitation attempt.

21. The method of claim 1, wherein the security monitor intercepting access faults from guard pages implements fault detection via platform-specific mechanisms including segmentation fault signals on Portable Operating System Interface (POSIX) systems or structured exception handling on Windows, fault handler execution in isolated signal handler or exception filter preventing corruption of main execution context, audit event generation recording fault address, fault type, timestamp, and suspected cause, immediate emergency wipe sequence triggering upon fence violation, process termination after memory clearing preventing continued execution of potentially compromised code, and forensic data collection including stack trace and register state for security incident investigation.

22. The method of claim 1, wherein T=400 milliseconds for financial fraud detection operations processing transaction data with PCI-DSS compliance, T=600 milliseconds for legal document analysis with attorney-client privilege protection, T=250 milliseconds for content moderation with Children's Online Privacy Protection Act (COPPA) compliance for minor protection, and T=150 milliseconds for cybersecurity threat analysis with ultra-fast response requirements, wherein each domain-specific configuration maintains emergency wipe capability, XOR verification, HMAC audit chain, and all security guarantees of steps (a) through (i).

23. The method of claim 1, further comprising batch processing support that processes multiple encrypted data items sequentially within single secure session, maintains cumulative plaintext exposure time T_cumulative tracking sum of all decryption-to-re-encryption windows, enforces per-item plaintext window T_item≤1000 ms for each individual operation, enforces session-wide maximum T_cumulative≤10000 ms (10 seconds) preventing excessive aggregate exposure, generates audit chain entry for each batch item including item identifier and timing, executes complete memory clearing after final batch item processing, and generates batch summary audit event containing total items processed, cumulative exposure time, and per-item statistics for compliance verification.

24. A system for secure client-side artificial intelligence processing with end-to-end encryption, comprising: a) a secure context validator configured to verify Hypertext Transfer Protocol Secure (HTTPS) protocol with Transport Layer Security (TLS) 1.3 or higher, Cross-Origin-Opener-Policy (COOP) header set to "same-origin", Cross-Origin-Embedder-Policy (COEP) header set to "require-corp", Strict-Transport-Security with max-age ≥31536000, and Origin Isolation policy, implementing a PASS/FAIL enforcement flow that terminates processing upon any validation failure and generates an audited REJECT event; b) a memory allocator implementing unmapped memory regions acting as guard pages that generate detectable access faults intercepted by a security monitor, 64-byte cache line alignment for all processing buffers, constant-time operations using bitwise comparisons to prevent timing attacks, and index masking with memory fences for Spectre mitigation; c) a WebAssembly execution environment comprising a dual-phase import control system with pattern-based whitelist and blacklist, a Security Monitor performing load-time parsing and instantiation-time verification, import table validation matching safe-operation patterns while rejecting disallowed patterns, and indirect call table restrictions with memory boundary enforcement; d) a bounded execution controller enforcing plaintext exposure time T≤1000 milliseconds with decryption timestamp recording via performance.now( ) with microsecond precision, monitoring loop executing every 100 ms via requestAnimationFrame, emergency wipe sequence completing within 15 ms upon timeout, and audit event generation for all violations; e) a Graphics Processing Unit (GPU) acceleration module when available, implementing a zero-copy tensor interface supporting Float16/Int8 formats, CPU to GPU transfer via ArrayBuffer.transfer( ) or equivalent zero-copy view/queue mapping mechanisms where supported without intermediate copies, mandatory plaintext clearing within 100 ms of kernel execution, SecurityError generation upon clearing timeout, and performance acceleration factors of Matrix operations 10-50×, Convolution 20-100×, Activation 5-20×; f) an audit chain generator creating tamper-evident logs using Hash-based Message Authentication Code (HMAC)-Secure Hash Algorithm (SHA)256 chaining with formula Hn=HMACk (Hn−1| event data || nonce timestamp), genesis block initialization with SHA-256(masterKey+Date.now( )), 16-byte cryptographically secure nonce per event via crypto.getRandomValues( ), session key derivation via HMAC-based Key Derivation Function (HKDF)-Secure Hash Algorithm (SHA)256 with rotation every 86400000 ms (24 hours), and JavaScript Object Notation (JSON) and Comma-Separated Values (CSV) export formats with verification capability; g) a cryptographic processor implementing non-extractable key storage via Web Crypto Application Programming Interface (API), WebAuthn/Fast Identity Online (FIDO)2 binding for key access control, scheduled key rotation every 2592000000 ms (30 days), forward secrecy via HKDF-SHA256, and Post-Quantum Cryptography (PQC)-ready hybrid derivation with versioned algorithm flags; h) a verified memory wipe module implementing National Institute of Standards and Technology Special Publication (NIST SP) 800-88 Revision 1 with exactly 3 passes (configurable to n>3), XOR verification between first and third random passes with threshold validation, audit event generation with timing and verification status, and ArrayBuffer detachment with reference nulling; i) wherein the system collectively transforms the web browser from a standard execution environment into a secure Artificial Intelligence (AI) processing environment providing time-bounded plaintext exposure, verified memory clearing, and cryptographic audit capabilities not provided by a conventional browser architecture and security policies.

25. The system of claim 24, wherein the Security Monitor implements Phase 1 load-time validation parsing WebAssembly.Module.imports(module) to extract import descriptors, regex pattern matching against whitelist /^(Math\.| Memory\.|Table\.|SIMD\.|WebGL\.|WebGPU\.|Performance\.now|Crypto.getRandomValues|Work er\.postMessage)/, regexpatternmatchingagainstblacklist/(DOM '|document'|window'|fetch|XMLHttpRequest|WebSocket|W/, immediate SecurityError on blacklist match with process termination, Phase 2 instantiation-time verification during WebAssembly.instantiate( ) validating actual import object, indirect call table validation ensuring no runtime import injection, memory bounds enforcement via WebAssembly.Memory constraints, Attestation Generator creating signed proof with Elliptic Curve Digital Signature Algorithm with a P-256 curve (ECDSA-P256), and Audit Chain Recording persisting attestation with timestamp and SHA-256 module hash.

26. The system of claim 6, further comprising a compliance certificate generator that captures processing session metadata including start time, end time, AI model identifier, data categories processed, and security events; binds certificate cryptographically to audit chain via hash reference creating tamper-evident linkage; generates regulatory-specific documentation for Health Insurance Portability and Accountability Act (HIPAA), Payment Card Industry Data Security Standard (PCI-DSS), General Data Protection Regulation (GDPR), California Consumer Privacy Act (CCPA), Family Educational Rights and Privacy Act (FERPA), and Financial Industry Regulatory Authority (FINRA) compliance frameworks; includes zero-knowledge proofs enabling third-party verification without exposing plaintext data; exports in JavaScript Object Notation (JSON), Extensible Markup Language (XML), or Portable Document Format (PDF) formats with ECDSA digital signature; and enables organizations to demonstrate compliance in certain deployment models without requiring Business Associate Agreements or compliance certifications from AI service providers.

27. The system of claim 24, further comprising a secure session manager that establishes session upon successful header validation in secure context validator, assigns unique session identifier via crypto.getRandomValues(new Uint8Array(32)) for tracking, initializes session-specific HMAC key via HKDF-SHA256(masterKey, session_id, "session-key") for audit chain, tracks cumulative session duration and cumulative plaintext exposure time across multiple operations, enforces maximum session duration of 3600000 ms (1 hour) before requiring re-authentication, terminates session immediately upon any security violation with complete memory clearing sequence, generates session summary in audit chain containing all security events, plaintext exposure statistics, and violation records, and enables forensic analysis of processing sessions for compliance auditing and incident investigation.

28. The system of claim 24, further comprising failsafe mechanisms including a deadman switch that triggers memory clearing sequence if heartbeat signal from monitoring loop stops for >200 ms indicating potential crash or hang, a panic button accessible via keyboard shortcut (Ctrl+ Shift+Esc) for immediate secure termination with emergency wipe, rate limiting preventing resource exhaustion attacks by limiting processing requests to maximum 10 per minute per origin, circuit breaker pattern for cascading failure prevention that opens after 3 consecutive security violations within 60 seconds, automatic rollback to safe state on any security violation with complete memory clearing and session termination, emergency contact notification via configurable webhook on critical security events, and tamper-evident seal on system configuration preventing unauthorized modification of security parameters.

29. The system of claim 24, further comprising multi-platform support enabling identical security guarantees across desktop browsers with full WebGPU support and hardware acceleration, mobile browsers with WebGL fallback and reduced memory footprint optimization, Electron applications with native integration and enhanced performance via Node.js addons, browser extensions with restricted permissions and Content Security Policy compliance, and Progressive Web Apps with offline capability and service worker integration for cached model execution, wherein all platforms implement identical security policies defined in components (a) through (i) with platform-specific performance optimizations that do not compromise security guarantees.

30. A non-transitory computer-readable medium storing instructions that, when executed by a processor within a web browser, cause the web browser to perform operations comprising: a) enforcing security headers including Cross-Origin-Opener-Policy (COOP)="same-origin", Cross-Origin-Embedder-Policy (COEP)="require-corp", Hypertext Transfer Protocol Secure (HTTPS) with HTTP Strict Transport Security (HSTS), and Origin Isolation before any cryptographic operations; b) establishing memory-isolated execution environment with unmapped guard pages and cache-aligned buffers; c) restricting WebAssembly imports to computational operation patterns only while blocking Document Object Model (DOM), network, file system, and storage access patterns; d) decrypting data within bounded time window $T \leq 1000$ ms with automatic emergency wipe upon timeout; e) processing through Artificial Intelligence (AI) models achieving domain-specific latency targets without server communication; f) re-encrypting results before any persistence or network transmission; g) performing multi-pass verified memory clearing with XOR validation per National Institute of Standards and Technology Special Publication (NIST SP) 800-88; h) generating tamper-evident Hash-based Message Authentication Code (HMAC) audit chain with rotating session keys; i) utilizing non-extractable keys bound to Web Authn credentials; wherein the instructions transform the web browser into a secure Artificial Intelligence (AI) processing platform maintaining end-to-end encryption while enabling use of advanced AI models with regulated data in full regulatory compliance.

* * * * *